Sept. 29, 1953     J. B. ARMITAGE ET AL     2,653,519
MACHINE TOOL TRANSMISSION AND CONTROL MECHANISM
Filed Dec. 21, 1946     12 Sheets-Sheet 1
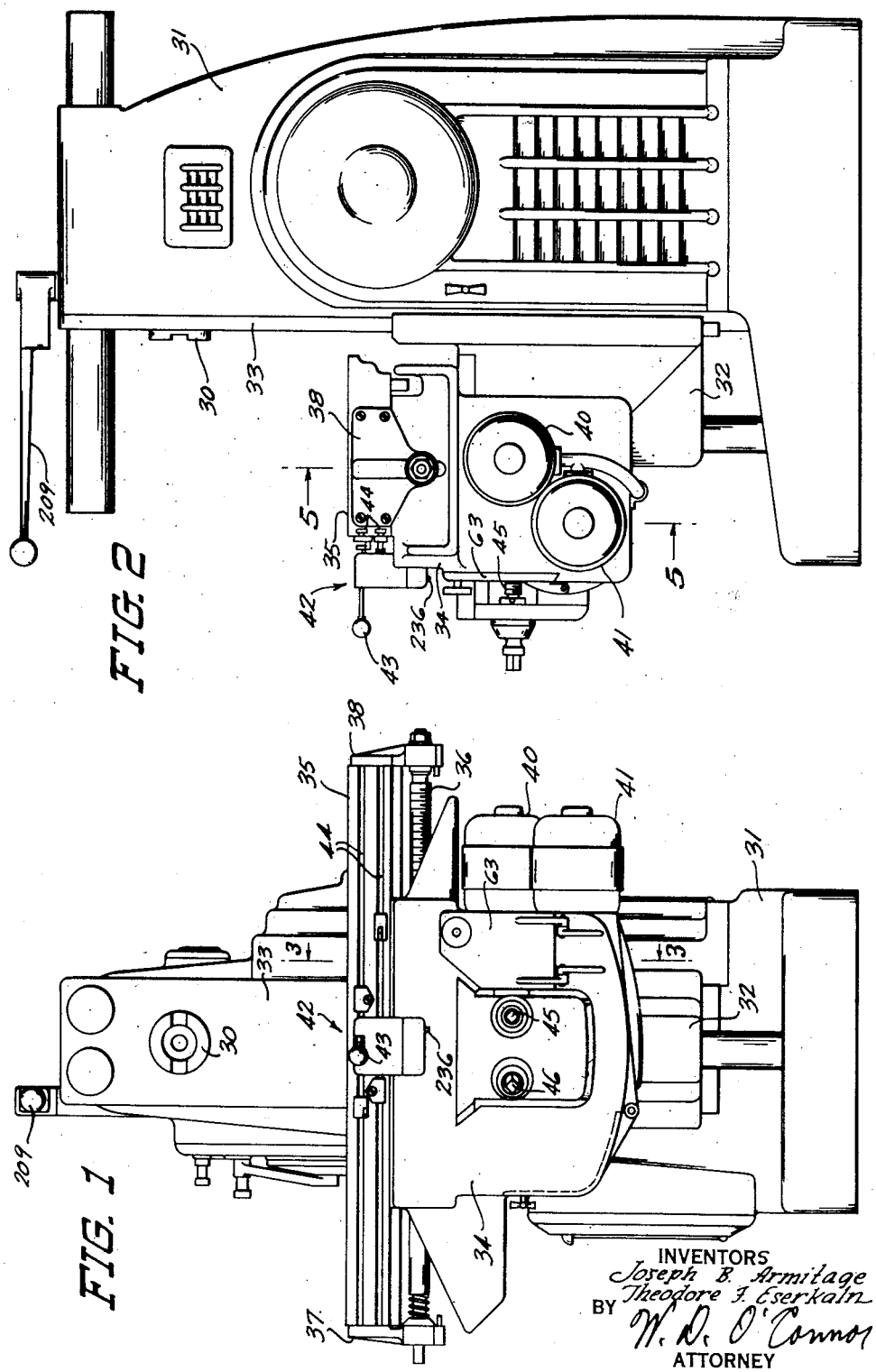
INVENTORS
Joseph B. Armitage
Theodore J. Eserkaln
BY
ATTORNEY Sept. 29, 1953          J. B. ARMITAGE ET AL          2,653,519
          MACHINE TOOL TRANSMISSION AND CONTROL MECHANISM
Filed Dec. 21, 1946                                12 Sheets-Sheet 2
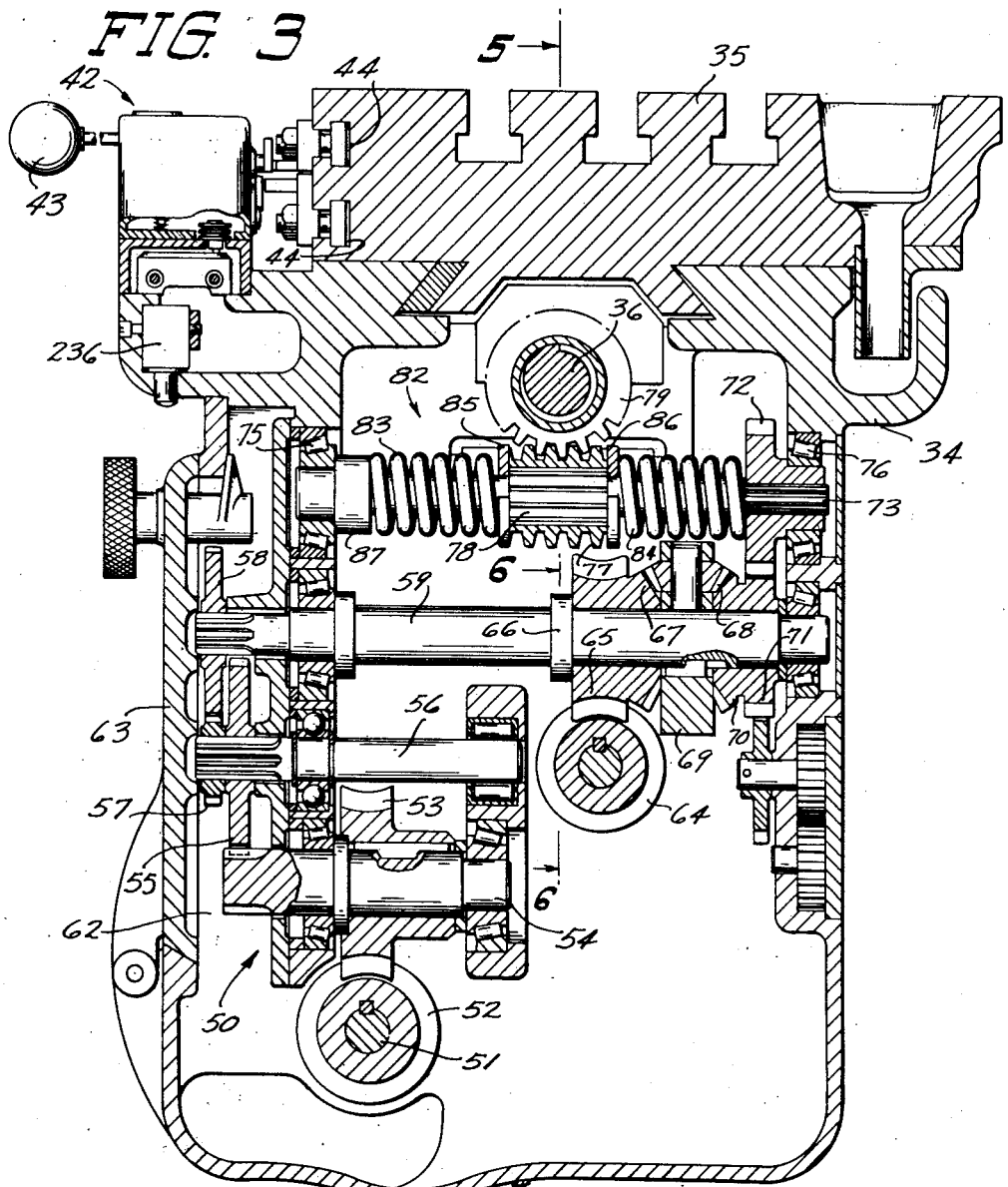
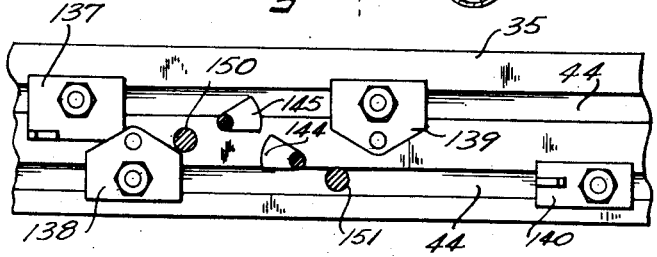
Joseph B. Armitage
Theodore F. Eserkain
INVENTORS
BY W. D. O'Connor
ATTORNEY Sept. 29, 1953　　　J. B. ARMITAGE ET AL　　　2,653,519
MACHINE TOOL TRANSMISSION AND CONTROL MECHANISM
Filed Dec. 21, 1946　　　　　　　　　　　　　　12 Sheets-Sheet 3

Joseph B. Armitage, &
Theodore F. Eserkaln
INVENTORS

BY W. D. O'Connor
ATTORNEY

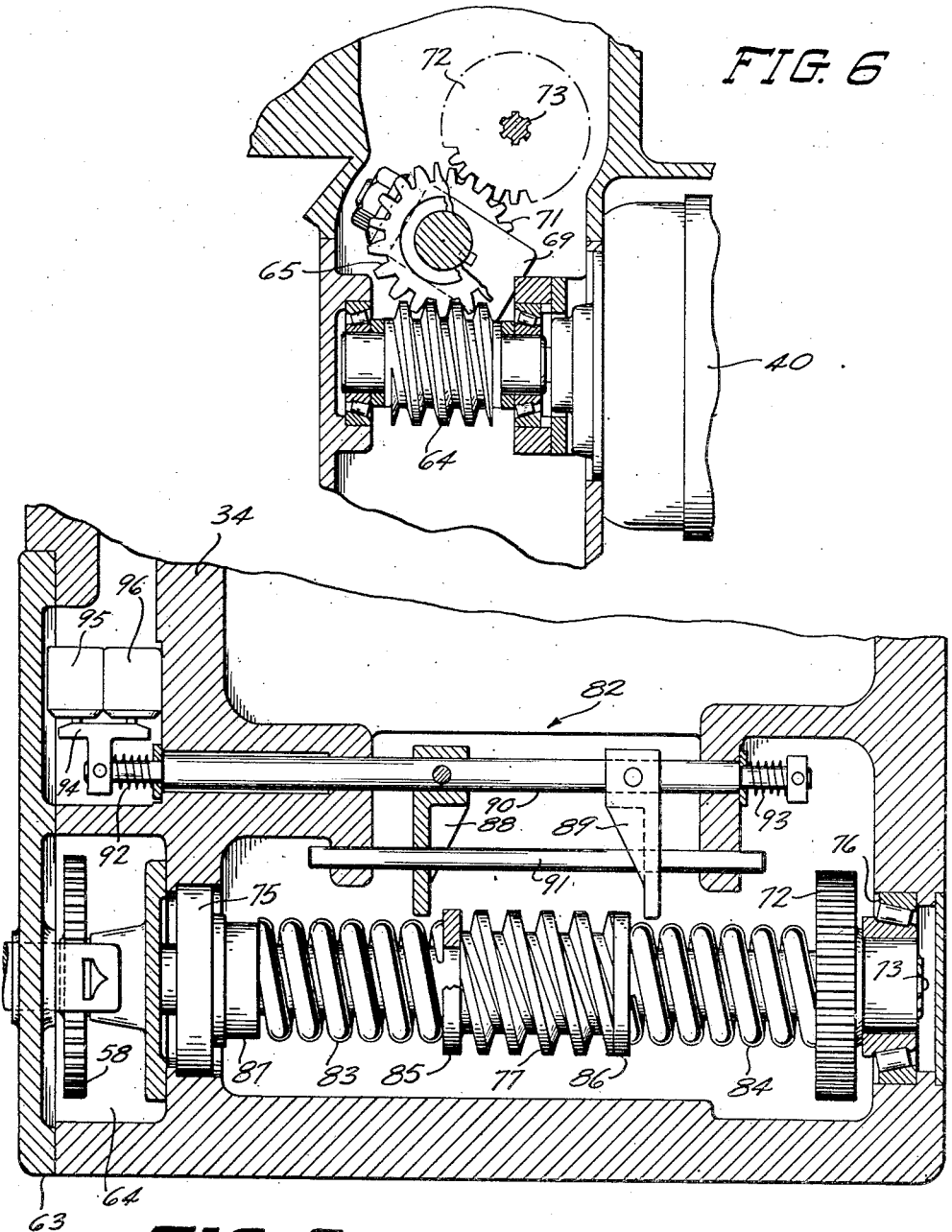

Sept. 29, 1953    J. B. ARMITAGE ET AL    2,653,519
MACHINE TOOL TRANSMISSION AND CONTROL MECHANISM
Filed Dec. 21, 1946    12 Sheets-Sheet 5
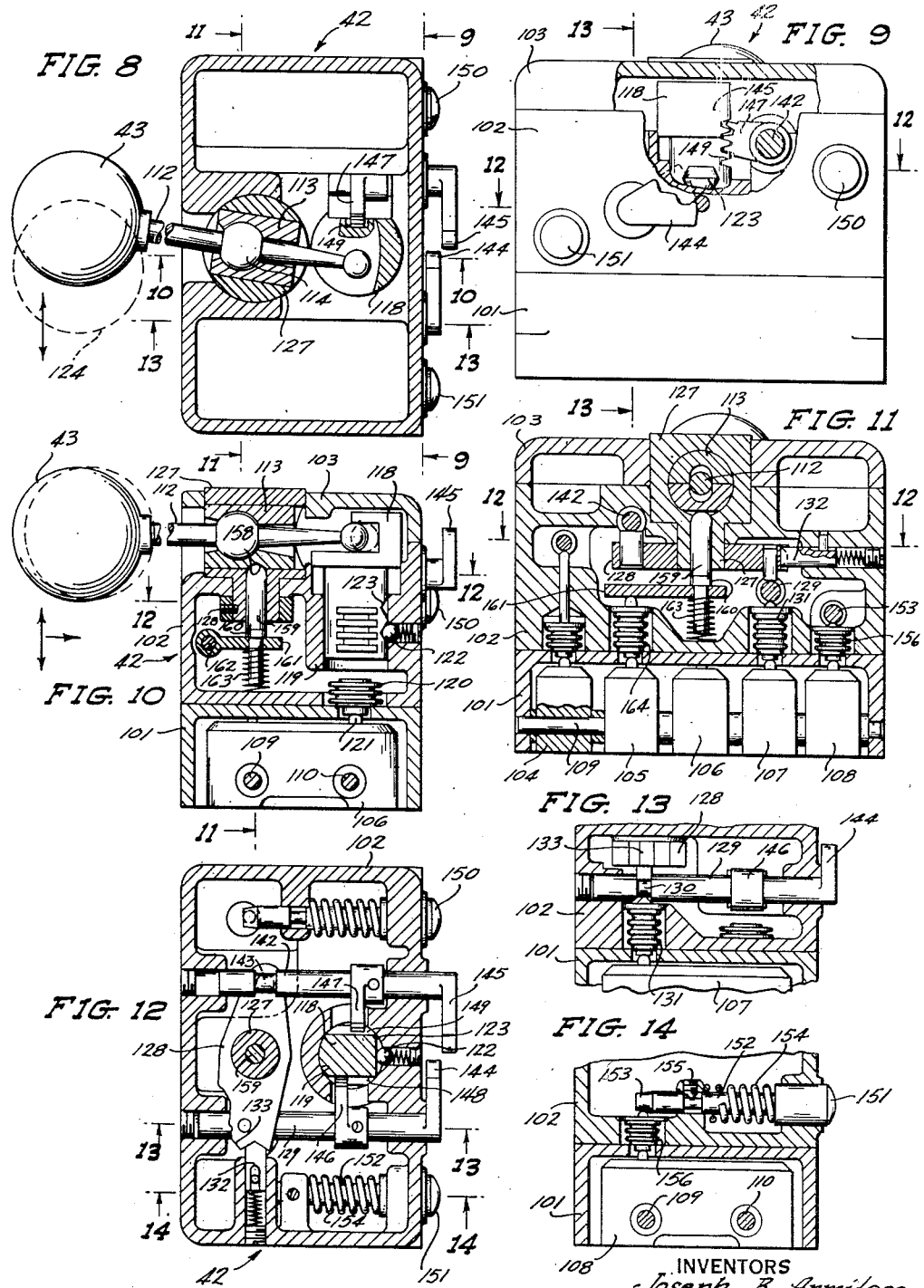
INVENTORS
Joseph B. Armitage
Theodore F. Eserkaln
BY
W. M. O'Connor
ATTORNEY Sept. 29, 1953   J. B. ARMITAGE ET AL   2,653,519
MACHINE TOOL TRANSMISSION AND CONTROL MECHANISM
Filed Dec. 21, 1946   12 Sheets-Sheet 7

FIG. 16

Joseph B. Armitage, &
Theodore J. Eserkaln
INVENTORS

BY W. D. O'Connor
ATTORNEY

Sept. 29, 1953    J. B. ARMITAGE ET AL    2,653,519
MACHINE TOOL TRANSMISSION AND CONTROL MECHANISM
Filed Dec. 21, 1946    12 Sheets-Sheet 9

Joseph B. Armitage &
Theodore F. Eserkaln
INVENTORS.

BY W. D. O'Connor
ATTORNEY

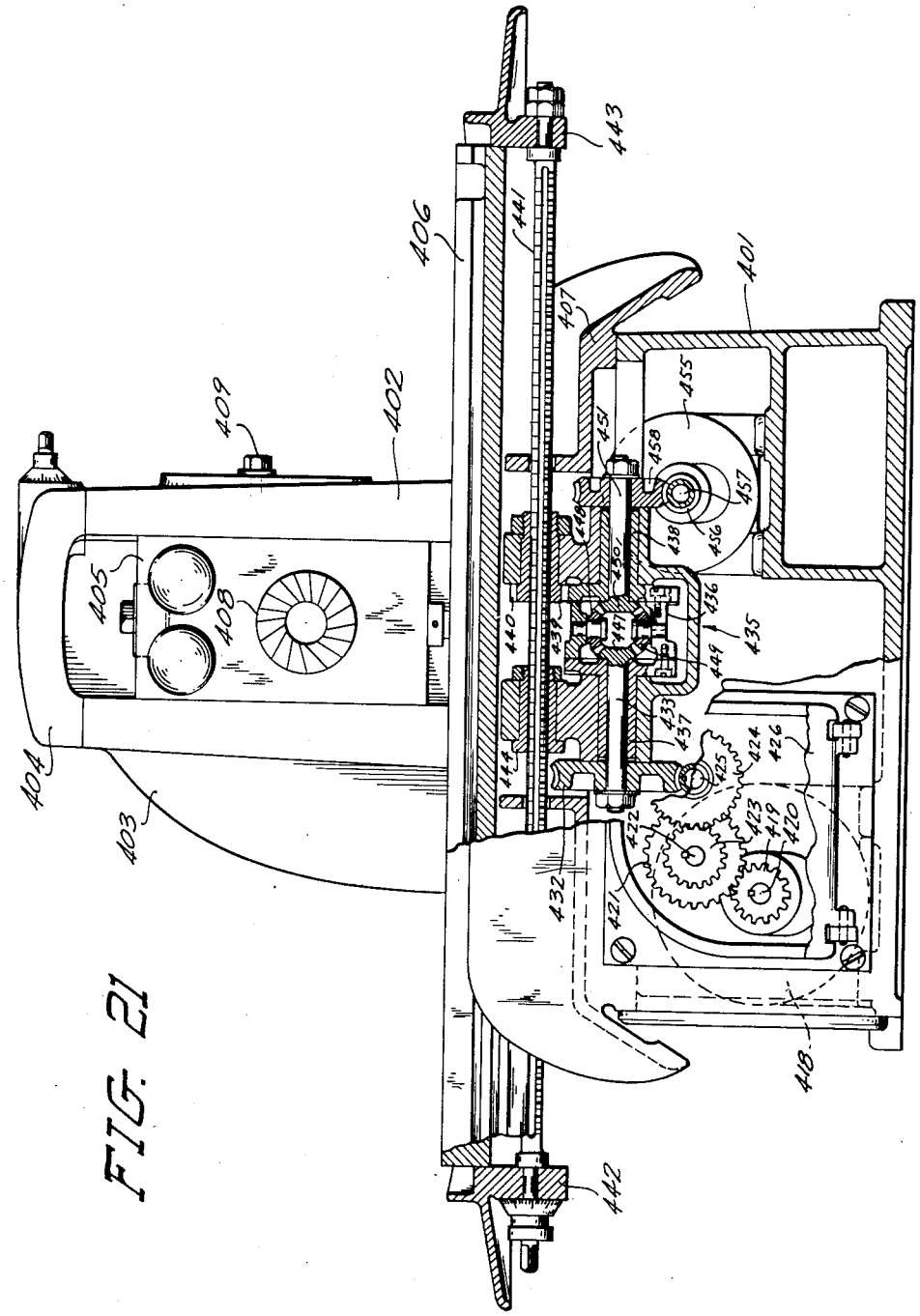

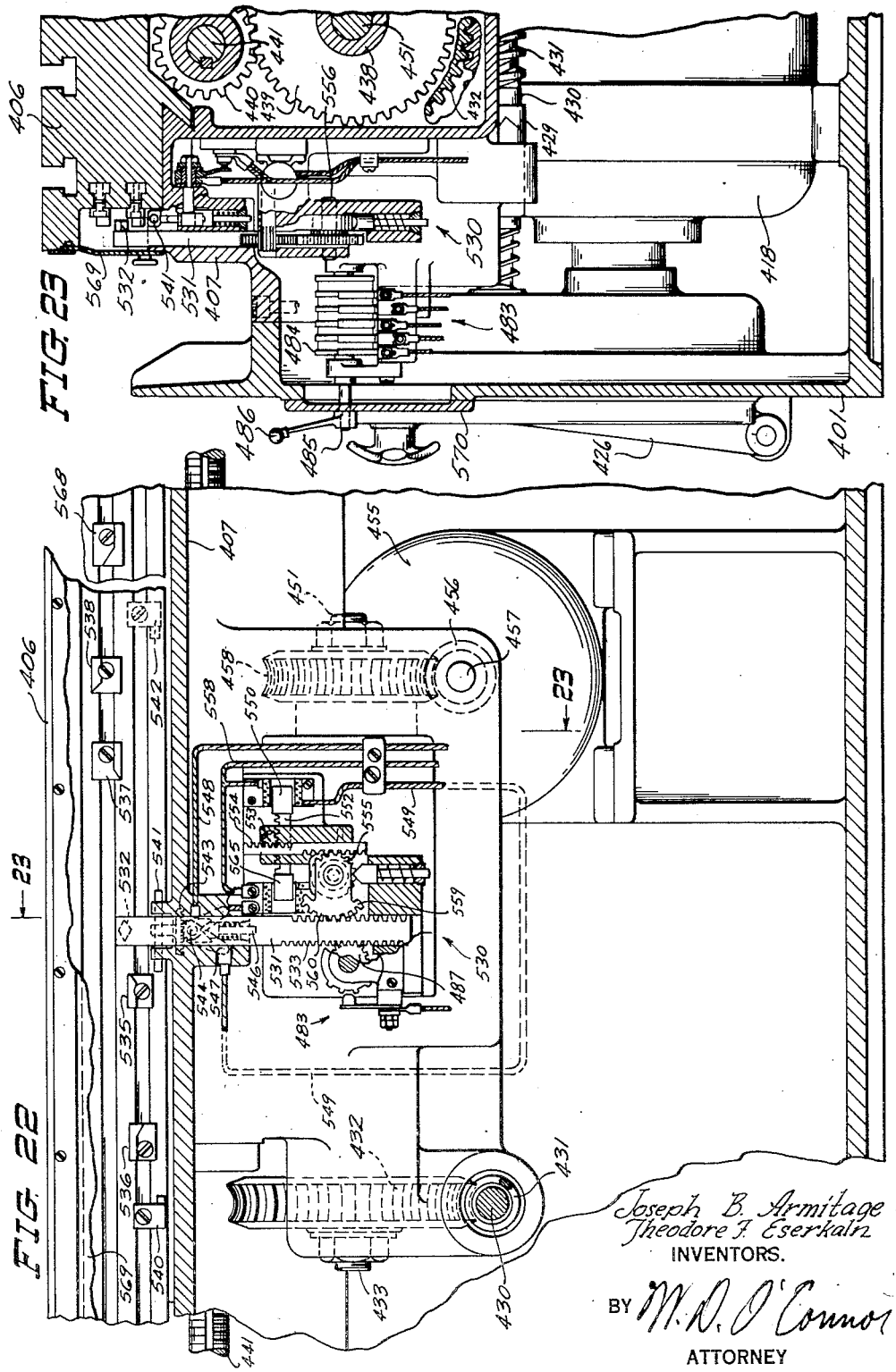

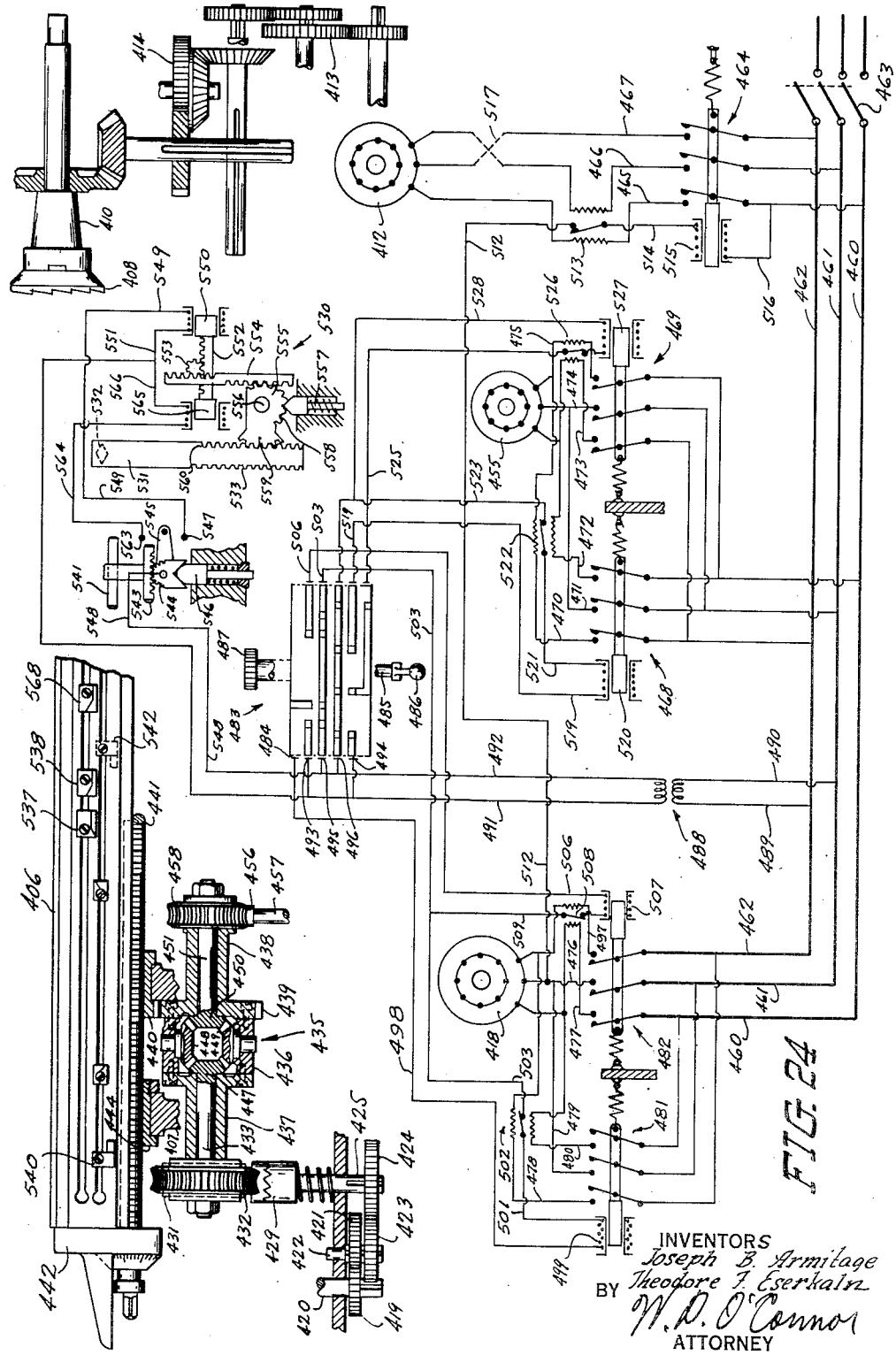

Patented Sept. 29, 1953

2,653,519

UNITED STATES PATENT OFFICE 2,653,519

MACHINE TOOL TRANSMISSION AND CONTROL MECHANISM

Joseph B. Armitage and Theodore F. Eserkaln, Wauwatosa, Wis., assignors to Kearney & Trecker Corporation, West Allis, Wis., a corporation of Wisconsin Application December 21, 1946, Serial No. 717,712

7 Claims. (Cl. 90—21)

This invention relates, generally, to machine tools and more particularly to machine tool transmission and control mechanism.

A general object of the invention is to provide an improved machine tool transmission mechanism, together with an improved control mechanism to provide selective operation thereof;

Another object of the invention is to provide separate motor drives for various machine tool elements with co-ordinated cyclic control of the motors.

Another object of the invention is to provide an improved multiple motor driven transmission having an automatic cyclic control system with an overload safety device in the transmission operative to interrupt the cyclic control upon the occurrence of an overload.

Another object of the invention is to provide an improved milling machine knee assembly having separate motors for providing a movable table with feed and rapid traverse drives.

Another object of the invention is to provide an improved automatic cyclic control system for a machine tool.

Another object of the invention is to provide an improved electrical control system for a milling machine.

Another object of the invention is to provide an improved overload means wherein a worm is disposed to move axially upon the occurrence of an overload to actuate a safety mechanism.

Another object of the invention is to provide a compact electrical control unit hermetically sealed to prevent foreign substances such as chips, coolant and the like from settling on the contacts.

Another object of the invention is to provide a machine tool drive mechanism incorporating differential gearing selectively driven from a plurality of motors.

Another object of the invention is to provide an improved drum type switch manually or automatically operable in a control circuit to effect predetermined speed and directional control of a machine tool element.

Another object of the invention is to provide an improved switch control mechanism operable in the control circuit for a machine tool.

Another object of the invention is to provide an improved dog-actuated tripping mechanism for actuating a control system to effect a predetermined operating cycle.

Still another object of the invention is to provide an electrical control circuit for a machine tool including a plurality of solenoid actuated shifting mechanisms.

According to this invention, an improved milling machine is provided having an automatic electrical control system. The movable elements of the machine are selectively driven by a differential mechanism at a plurality of feed rates or at a rapid traverse rate. Separate motors are connected to the differential, one for the feed drive and one for the rapid traverse drive. A variation in the feed rate is effected mechanically through a pick-off gear transmission. A predetermined operating cycle for the two power drives may be selected by positioning a series of trip dogs relative to dog actuated control plungers operably mounted in a control box. The plungers are disposed to actuate micro-switches hermetically sealed in the box. A single control lever operably carried in the control box affords manually controlled directional and feed-rapid traverse drive operation. An overload mechanism operative with a machine element driving worm serves to effect axial movement of the mechanism upon the occurrence of an overload to actuate micro-switches electrically connected to interrupt the power drive. All of the micro-switches are connected in a control circuit with other electrical mechanisms to afford selective manual or automatic control of the motors driving the machine element. Several modifications of the control circuit are provided wherein a multiple position manually or automatically operable drum switch is used to energize the motors. The switch, likewise, is automatically set by a plurality of trip dogs predeterminately positioned on the movable element of the machine.

The foregoing and other objects of this invention, which will become more fully apparent from the following detailed description of an embodiment thereof, may be achieved by the apparatus herein described by way of example in connection with the illustration in the accompanying drawings, in which:

Figure 1 is a front elevational view of a machine tool incorporating the principles of the invention;

Fig. 2 is a view in side elevation of the machine shown in Fig. 1;

Fig. 3 is a vertical sectional view taken on the plane of the line 3—3 in Fig. 1 showing the feed and rapid traverse drives to the table screw;

Fig. 4 is a fragmentary view of the trip dogs positioned in the T slots of the table;

Fig. 6 is a detailed view in vertical section of the rapid traverse drive worm and differential taken substantially along the plane of the line 6—6 in Fig. 3;

Fig. 7 is an enlarged view of the table drive worm resiliently mounted for axial movement and the automatic overload signal mechanism taken substantially along the plane of the horizontal line 7—7 in Fig. 5;

Fig. 8 is an enlarged horizontal sectional view of the automatically and manually operated control element shown mounted on the movable saddle in Figs. 1, 2 and 3;

Fig. 9 is another view of the control element taken substantially on the plane of the line 9—9 in Fig. 8;

Fig. 10 is a vertical view through the control element showing the mounting of the control handle and operating mechanism taken on the plane of the line 10—10 in Fig. 8;

Fig. 11 is a detailed vertical view taken on the plane of lines 11—11 in Figs. 8 and 10 showing the actuating means for the five micro switches;

Fig. 12 is a detailed horizontal view of the switch actuating means taken on the plane of lines 12—12 in Figs. 9, 10 and 11;

Fig. 13 is a vertical sectional view of a trip dog actuated control rod horizontally disposed in the control box as shown by the plane of lines 13—13 in Figs. 8, 9 and 12;

Fig. 14 is a fragmentary vertical section on the plane of line 14—14 in Fig. 12 showing another of the horizontal switch control rods;

Fig. 16 is a schematic diagram of a modified version of a machine tool drive system incorporating two feed drive motors;

Fig. 21 is an elevational view of a bed type milling machine incorporating the principles of the invention;

Fig. 22 is a vertical fragmentary sectional view of the front of the machine shown in Fig. 21 showing the automatic switch actuating mechanism;

Fig. 23 is a vertical sectional view taken on the plane of the line 23—23 in Fig. 22 showing the mounting of the drum type control switch in relation to the trip mechanism; and, Fig. 24 is a schematic diagram of the mechanical drive trains and the electrical control circuit for the machine shown in Figs. 21, 22 and 23 and constituting a modified version of the invention.

Figure 5:
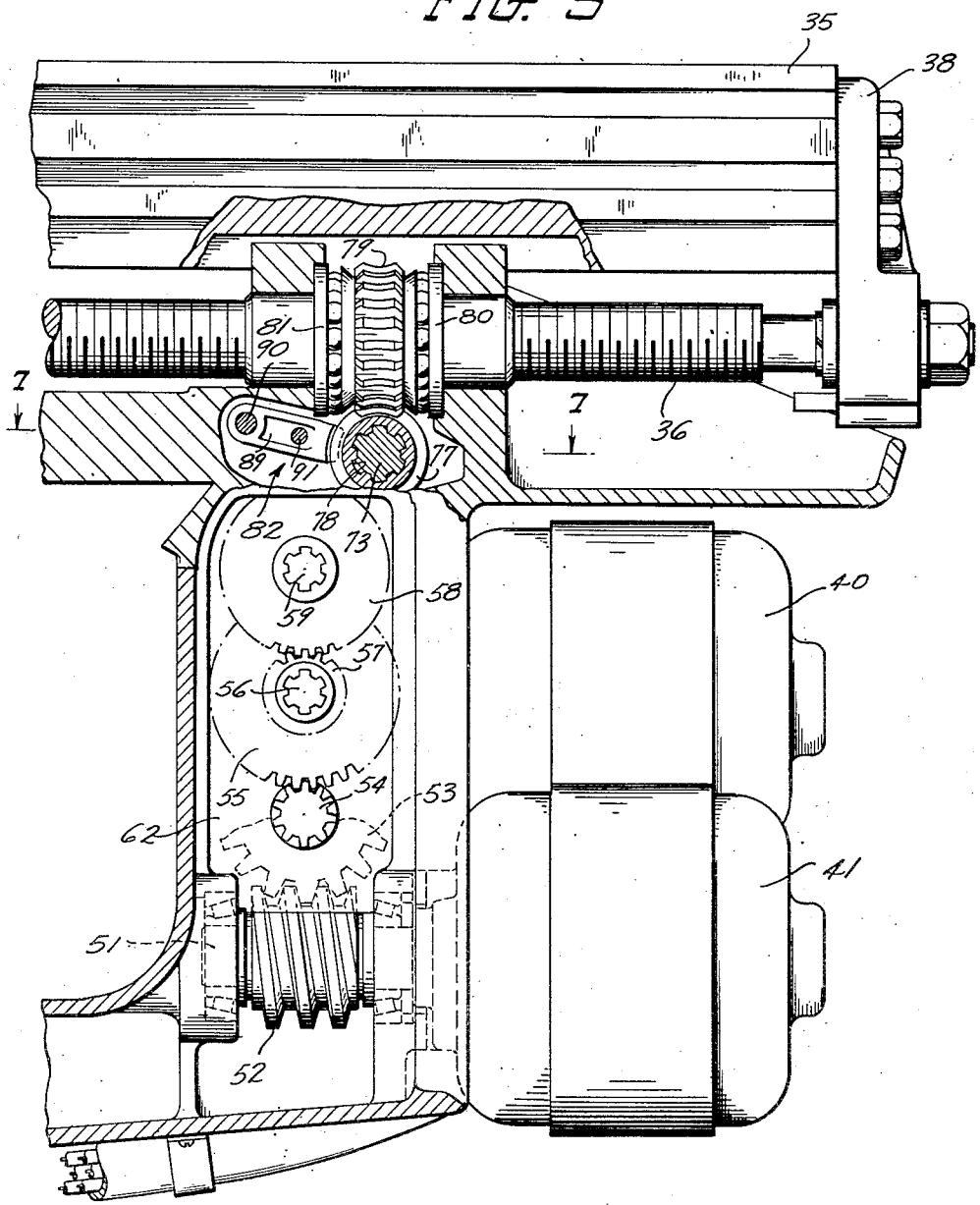
Fig. 5 is a vertical sectional view of the driving motors, transmission and table drive mechanism taken on the plane of lines 5—5 in Figs. 2 and 3.

Referring to the drawings, and more particularly to Figs. 1 and 2 thereof, the invention is shown incorporated in a knee type milling machine. A horizontal spindle 30 is rotatably journalled in an upright column member 31 constituting the machine frame. The spindle is power driven at any one of a plurality of speed rates by a motor driven, shiftable gear transmission (not shown) in a manner well known in the machine tool art. A knee 32 is slidably mounted for selective vertical adjustment on way surfaces 33 on the front face of the column 31. A saddle 34 is slidably disposed for horizontal movement on the top of the knee 32 while a table 35 is slidably mounted on the saddle 34 for longitudinal horizontal movement, whereby workpieces mounted on the table may be predeterminately positioned relative to the cutter retaining spindle 30 in three mutually transverse planes. The table 35 is driven by means of a screw shaft 36 rotatably journalled in end brackets 37 and 38 attached to the ends of the table, as shown in Fig. 1.

In the conventional knee type milling machine, the table 35, saddle 34 and knee 32 are provided with driving mechanisms to effect selective power movement of the elements in the aforementioned transverse planes. The source of power for these drives generally consists of a motor located in the column of the machine. In addition, the spindle 30 is driven by this same motor through a speed transmission to provide a large speed range. This arrangement necessitates the use of much additional driving mechanism.

According to the invention disclosed herein, the interconnecting driving mechanism between the column 31 and the knee 32 is eliminated and separate driving motors are provided to drive the table 35 at feed or rapid traverse rates and to drive the spindle drive mechanism, together with electric control mechanism designed to permit the automatic power operation, selective power operation or manual operation of the table 35 as may be required for a given milling setup.

To this end, the saddle 34 is provided with a yoke which completely surrounds the machine knee 32, as shown in Fig. 1. A rapid traverse motor 40 and a feed drive motor 41 are bolted on the right side of the saddle 34 in a manner to move with the saddle toward or from the face of the column 31. Both of the motors, together with the spindle motor (not shown) contained within the column 31, are controlled from an electric control unit 42, mounted on the front of the saddle. The control element is manually operable by means of a control handle 43, or automatically operable from a plurality of trip dogs carried in T-slots 44 on the front of the table 35. A power drive is not provided for the knee 32 or the saddle 34. Rather a manually actuated drive mechanism is provided for positioning each of these elements; the saddle 34 may be manually adjusted by applying a crank (not shown) to the squared end of a screw shaft 45 and rotating it in a manner to move the saddle toward or from the face of the column 31. Likewise, the knee may be selectively adjusted vertically on the way surfaces 33 of the column 31 by rotating a crank handle (not shown) positioned on the end of an actuating shaft 46.

As shown in Fig. 3, a power feed mechanism 50 is disposed within the saddle 34 and serves to provide a power feed drive for the table 35 at any one of a plurality of feed rates. A feed motor armature shaft 51 extends through the side wall of the saddle 34 and is keyed to drive a worm 52 journalled therein. The worm meshes with and drives a worm wheel 53 which is intermediately keyed on a pick-off gear drive shaft 54 journalled within the saddle, as shown in Figs. 3 and 5. Gear teeth integrally formed on the end of the shaft 54 mesh with teeth on a pick-off gear 55 splined to an intermediate shaft 56. A second gear 57 is likewise splined on the end of the shaft 56 and is disposed to mesh with a gear 58 slidably splined to the end of a feed driving shaft 59. The shafts 54, 56 and 59 are parallelly disposed with one end of each extending into a gear compartment 62 disposed in the right front side of the saddle 34. When an uprightly hinged door 63 on the front of the machine, as shown in Figs. 1, 2 and 3, is opened, the pick-off gears may be removed readily from the ends of the shafts 56 and 59, and interchanged for other gears to provide a plurality of combinations, whereby the shaft 59 may be driven at any one of a plurality of predetermined speeds.

Power for the rapid traverse drive is derived from the motor 40 mounted on the right side of the saddle 34, and is transmitted therefrom to a worm 64 rotatably journalled within the saddle. The worm 64 meshes with and drives a worm wheel 65, rotatably carried on the feed drive shaft 59, and is retained thereon against axial movement by means of a collar 66 integrally machined on the middle of the shaft. A bevel gear 67, unitarily formed with the worm wheel 65, is disposed to mesh with a spider gear 68 (see Figs. 3 and 6) rotatably journalled on a differential carrier 69 keyed to the feed driving shaft 59. A second bevel gear 70 is likewise disposed on the shaft 59 in a manner to engage the teeth of the spider gear 68 and is integrally formed with a spur gear 71, which meshes with and drives a gear 72 splined on the end of shaft 73. The shaft 73 is journalled in bearings 75 and 76 in the saddle 34 and drives a worm 77 retained thereon on a centrally splined portion 78. The worm 77 meshes with and drives a worm wheel 79, as shown in Fig. 5, rotatably journalled in the saddle structure in a pair of thrust bearings 80 and 81. The worm wheel 79 and the associated mounting assembly constitute a driving nut threadably mounted on the table screw shaft 36 in a manner, when rotated, to effect longitudinal movement of the table at a selected feed or rapid traverse rate.

With the arrangement aforedescribed, the table 35 may be driven at a selected feed rate whenever the feed motor 41 is energized. The direction of table travel is dependent upon the direction of rotation of the feed motor 41 and is controlled automatically or manually through the electric control unit 42. When the motor 41 is thus energized, the feed driving shaft 59 will be driven at a rate dependent upon the gear ratio set up by the operator by adjusting the pick-off gears in a manner well known to the machine tool art. When the shaft 59 is rotated in either direction, the differential carrier 69 keyed thereto will be rotatably driven and will, consequently, drive the shaft 73 through gearing 70, 71 and 72. The shaft 73 will, in turn, drive the worm 77 and worm wheel 79 and effect longitudinal movement of the table 35 at a predetermined feed rate. Table movement will be halted when the feed motor 41 is de-energized.

When the rapid traverse motor 40 is energized, the worm wheel 65 and gear 67 integrally formed therewith will be driven at a constant speed dependent upon the fixed speed of the motor 40. Rotation of the gear 67 will drive the spider gear 68 and gear 70 at a corresponding speed and, via shaft 73, will drive the worm 77 and worm wheel 79 at rapid traverse rate. Consequently, movement of the table 35 will occur at rapid traverse rate with the direction of movement dependent upon the direction of rotation of the rapid traverse motor 40. Since the differential carrier 69 is keyed to the shaft 59, the gears 67 and 70 will be driven at the same speed when the shaft 59 is stationary and consequently, the table 35 will be driven at a rapid traverse rate substantially higher than the feed rate transmitted via the speed driving shaft 59. Should the rapid traverse motor 40 and the feed motor 41 be energized simultaneously, the differential carrier will rotate at a speed identical to that of the shaft 59 but the table 35 will be driven at rapid traverse rate because the power supplied from the rapid traverse motor 40 will also be transmitted through the spider gear 68 to the gear 70. With this arrangement of worm and worm wheel drives to two elements of the differential, when one or the other of the motor 40 or 41 is energized, a back drive will not result to the other motor which is then inoperative. The energization of the rapid traverse motor 40, together with its direction of rotation, is likewise dependent upon the automatic or manual manipulation of the feed control unit 42 in a manner to be more fully described hereinafter.

A safety feature incorporated in the machine relates to an overload protective device 82 operative with the aforedescribed table drive mechanism. As previously mentioned, the worm 77 is slidably splined upon the splined portion 78 of the shaft 73, as shown in Fig. 3. The worm 77 is centrally retained in position in relation to the worm wheel 79 by a pair of coil springs 83 and 84 and retaining washers 85 and 86 (see Figs. 3 and 7). One end of the spring 83 abuts against a collar 87 formed on the left end of the shaft 73 while the other end abuts against the washer 85 disposed adjacent to the left end of the worm 77. The spring 84 abuts against the side of the gear 72 and against the washer 86 which is disposed against the right side of the worm 77. Since the springs 83 and 84 are evenly balanced, the worm 77 will be retained in a central position during normal operating conditions. Shoulders on the splined portion 78 of the shaft 73 prevent the worm 77 from being shifted out of this central position except upon the occurrence of an overload. When an overloaded condition occurs in the driving train due to an excessive load being placed on the driving mechanism, additional force will be exerted upon the worm wheel 79 by the worm 77. This will cause the worm to be axially displaced on the splined portion 78 of the shaft 73 against the pressure of either spring 83 or 84 depending upon the direction and amount of the force. Thus, the two springs 83 and 84 serve to act as a cushion in absorbing excessive thrust loads placed upon the worm 77 in the machine tool drive train. Such loads are absorbed by the springs and are dissipated in this manner in order to prevent any damage to the gears in the transmission. As shown in Figs. 3, 5 and 7, such an axial displacement beyond predetermined limits will cause either one or the other of the washer 85 or 86 to be brought into contact with feeler forks 88 or 89, respectively. Both of the forks are pinned on a shifter rod 90 slidably retained in the saddle 34, and are slidably supported on a guide bar 91.

Movement of the worm 77 axially beyond predetermined limits serves to impart a corresponding axial movement to the rod 90. The rod 90 is resiliently cushioned at each end by springs 92 and 93, which normally tend to retain the rod in the central position shown in Fig. 7. However, when the rod is axially displaced, an actuating cam shoe 94 pinned to the rod 90 is likewise moved a sufficient distance to operate one or the other of two micro switches 95 and 96. Thus, when the worm 77 moves axially to the right, the washer 86 will engage the feeler fork 89, which, in turn, will effect a rightwardly axial movement of the shifter rod 90 to actuate switch 95 and interrupt the motor circuit. For example, if the worm 77 is caused to move leftwardly under pressure, the washer 85 will engage the feeler fork 88 and will cause the rod 90 to move leftwardly until the plunger on the switch 96 is actuated. Thus, rightwardly or leftwardly, movement of the cam shoe 94 serves to operate one or the other of the two normally closed micro switches 95 and 96, and to interrupt the circuit to the rapid traverse or feed drive motors 40 and 41 in a manner to be hereinafter more fully described. Such a circuit interruption will immediately interrupt the power drive to the table 35 until the overloaded condition is eliminated.

The entire control of the machine is centered in the aforementioned electric control unit 42 centrally disposed on the front of the saddle 34, as shown in Figs. 1 and 2. All the driving motors for the machine may be co-ordinately energized, or individually energized, by the manipulation of the control handle 43 extending from the unit 42, or an automatic cycle of operation may be set up by means of a series of trip dogs adjustably positioned on the front of the table 35, as shown in Fig. 4. These dogs actuate one of several operating arms or buttons extending from the rear of the electric control unit 42. The control unit 42 consists of three members, namely: a base frame member 101, as shown in Figs. 10 and 11, an intermediate frame 102, and a top cover 103 fastened together. The base member 101 completely encloses five micro switches 104, 105, 106, 107 and 108. They are supported on a pair of rods 109 and 110 secured in the frame 101. The actuating mechanism for the control unit 42 is contained within the intermediate frame 102.

The actuating handle 43 is carried on the end of a rod 112 universally mounted for pivotal and axial movement in a slide block 113, as shown in Figs. 8 and 10. A ball 114 integrally formed on the rod 112 is seated in a socket 115 formed in the block 113. As clearly shown in Fig. 10, this mounting allows the control handle 43 to be moved in a vertical plane. Thus, the manipulation of the control handle 43 will serve to impart movement to the inner end of the rod 112, which is socketed in the top of a plunger piston 118. The piston 118 is slidably mounted in a cylinder 119 integrally formed in the intermediate frame member 102. When the control handle 43 is raised upwardly, the piston 118 is forced downwardly in the cylinder 119 until the lower end thereof engages an actuating bellows or pneumatic coupling 120 disposed in the frame 102 with its lower end abutting against an actuating knob 121 on the top side of the micro switch 106. When the bellows 120 is actuated, a set of contacts within the switch is closed to complete a circuit to the rapid traverse motor 40 and effect a power drive at rapid traverse rate to the movable machine member.

With the handle 43 and rod 112 positioned as shown in Fig. 10, the piston 118 is retained in an upper position in which the bellows 120 is not engaged. When thus positioned, a second set of contacts (not shown) within the switch 106 is closed to complete a circuit to the feed drive motor 41 and effect a power drive to the table 35 at feed rate. A spring actuated detent mechanism 122, mounted in the intermediate frame 102, serves to operate on a pair of cavities 123 machined in the side of the piston 118 in a manner to retain the piston 118 in either the upper feed drive or lower rapid traverse drive position.

The direction of table movement is manually controlled by moving the control lever 43 to the right or left in a horizontal plane, as indicated by the arrows in Fig. 8. Thus, when the control handle 43 is moved to the position shown in Fig. 8, the table 35 will move leftwardly, whereas, if the handle 43 is moved to the position indicated by the dotted circle 124, the table will be power driven in a rightwardly direction. Such movement of the control handle serves to rotate a swivel block 127. The block 127 is rotatably mounted in the intermediate frame 102, and the upper portion thereof, as shown in Figs. 10 and 11, is designed to retain the sliding block 113 for slidable axial movement. A toggle plate 128 is attached to the lower end of the swivel block 127 in a manner that rotation thereof serves to effectively rotate the plate 128 clockwise or counter-clockwise from a neutral position (see Figs. 10, 11 and 12).

When the control handle 43 has been selectively positioned for leftwardly movement of the table 35, as shown in Fig. 8, the swivel block 127 and plate 128 will be rotated in a clockwise direction. Such rotation of the plate 128 serves to impart an axial movement to a pilot rod 129 in a leftwardly direction, as shown in Figs. 12 and 13. This movement of the pilot rod 129 will cause a reduced portion 130 on the rod 129 to release an actuating bellows 131 associated with the direction micro switch 107. Since the switch 107 is of the normally closed type, the contacts therein will remain closed to effect movement of the table 35 in one direction at feed or rapid traverse rates. A detent mechanism 132 automatically operative in notches 133 serves to retain the toggle plate 128 in the selected position. However, when the control handle 43 is manually shifted to the dotted position 124 (see Fig. 8) the block 127 and toggle plate 128 will be rotated in a counter-clockwise direction from the position shown in Fig. 12 to bring the enlarged portion of the pilot rod 129 into engagement with the actuating bellows 131. When the bellows 131 is depressed to actuate the direction micro switch 107, a control circuit will be broken to effect energization of the rapid traverse or feed motor 40 or 41 in the reverse direction. The manner in which reversal of the motors is electrically effected will be hereinafter more fully described.

The feed or rapid traverse switch 106, or the direction switch 107, in the electric control unit 42 may also be automatically operated from a series of trip dogs 137, 138, 139 and 140 predeterminately positioned in the T-slots 44 on the machine tool table 35, as detailedly shown in Fig. 4. Trip dogs 137 and 140 serve as limit stops to halt table movement in a given direction at a prescribed point of travel, while trip dog 138 effects reversal in the direction of travel and trip dog 139 effects a change in the rate of table travel at another prescribed point of travel. By varying the settings of the trip dogs, any number of cycles of operation can be initiated for table operation.

The automatic mechanism is interconnected with the abovedescribed manually operated control mechanism within the control unit 42 to constitute a single compact member. The reversing and rate setting trip dogs 138 and 139 are each disposed to impart rotative or axial movement to one of two pilot rods, namely: the pilot rod 129 or a pilot rod 142. The rod 142 is mounted in the frame 102 parallel to the rod 129 and is mechanically connected to the toggle plate 128 by means of a pin 143 (see Figs. 11 and 12) for axial movement opposite to that of rod 129. Thus, when a cam arm 144 attached to the end of the rod 129 is forced inwardly through engagement with a trip dog, the corresponding movement of the plate 128 will force the rod 142 outwardly to position a cam arm 145 on the extending end thereof for engagement with a trip dog at some subsequent portion of the operating cycle.

Automatic cyclic operation of the feed or rapid traverse rate switch 106 is effected through engagement of the trip dogs with the cam arms 144 and 145, respectively, as shown in Fig. 4. Such engagement serves to impart a rotative movement to each of the trip rods without disturbing the axial position of the rods in the frame 102. A gear segment member 146 is pinned on the pilot rod 129 while a similar gear segment 147 is pinned on the pilot rod 142, as generally shown in Figs. 8, 9, 12 and 13. The gear segment 146 meshes with a rack 148 machined on one side of the plunger piston 118 while the gear segment 147 is disposed to mesh with a rack 149 formed on the opposite side of the piston 118 (see Figs. 9, 10 and 12). Meshing engagement is maintained regardless of the axial adjustment of the pilot rods 129 and 142. The rotation of either of the pilot rods 129 or 142 imparts a controlled upwardly or downwardly movement to the piston 118 to operate the rate switch 106 in the manner aforedescribed. Thus, the table 35 may be automatically operated in a predetermined cycle at feed rate or at rapid traverse rate from the trip dogs. It should be noted that the engagement of a trip dog with a cam arm on the end of one of the pilot rods immediately actuates the other pilot rod to bring its cam arm into position so that it may be engaged by a trip dog at some subsequent part of the operating cycle.

The limits of table travel are automatically controlled in either direction by operating either of the microswitches 104 or 108. As shown in Fig. 4, the trip dog 137, when predeterminately positioned, controls the extreme rightwardly movement of the table 35 when it engages the actuating button 150 extending from the rear side of the electric control box 42 (see Figs. 8, 9, 10 and 12), while the actuating button 151 controls the extreme leftwardly movement of the table for a given operating cycle when it is engaged by the trip dog 140. The two dogs 137 and 140 and their respective buttons 150 and 151 are disposed in different operating planes in order to eliminate the possibility of an accidental engagement between opposite pairs of dogs and buttons. The button 151, as shown in Fig. 14, is attached to a rod 152 having a cam surface 153 formed at its inner end. A spring 154 resiliently retains the rod assembly in its outer axial limits of movement. The cam surface 153 engages an actuating bellows 156 mounted in the frame 102 to engage the limit stop switch 108. Since the switch 108 is of the normally closed type, any engagement of the dog 140 with the button 151 serves to operate the switch to open the contacts therein, interrupt the current flow to the drive motors, and halt further leftwardly power movement of the table 35 at either feed or rapid traverse rate. The other actuating button 150 is likewise mechanically linked to actuate the switch 104 and thereby limit rightward movement of the table 35.

Both the feed motor 41 and the rapid traverse motor 40 may be electrically braked to standstill by the machine operator. This may be accomplished by manipulating the control handle 43 in an axial direction. As previously explained, the control handle rod 112 is universally mounted in the slide block 113 which, in turn, is slidably mounted in the swivel block 127. The path of movement of the block 113 corresponds generally to the axis of the rod 112 so that the operator need only impart inward force to the handle 43 in order to cause the slide block 113 to move inwardly, as indicated by dotted lines in Fig. 10. Such inward movement of the rod and block does not disturb the setting of the handle 43 otherwise. Thus, it may remain positioned for selective directional or rate movement of the table member 35 with such a manipulation of the handle 43 merely serving to instantly apply a braking action to the table drive mechanism as long as the handle 43 is held in the braking position.

A detent notch 158 in the bottom of the slide block 113 normally is disposed to receive a detent plunger 159 centrally disposed for axial movement in the downwardly extending portion of the swivel block 127. The lower end of the plunger 159 abuts against the head end of a contact pin 160 embeddedly retained in a flapper plate 161. The plate 161 is hingedly mounted in position within the electric control unit 42 on a hinge pin 162 mounted in the intermediate frame member 102. As shown in Figs. 10 and 11, the plate 161 is resiliently retained, via a spring 163, in a normal upper position, whereby the plunger 159 is forced into the detent notch 158. But when the control handle 43 is pushed inwardly, the plunger 159 is forced downwardly out of the detent notch 158. This downward movement, against the pressure of the spring 163, causes the flapper plate 161 to be tilted downwardly so that it compresses a bellows 164 and actuates the normally closed all-stop switch 105. The actuation of this switch serves to interrupt the electrical control circuit to both drive motors 40 and 41 and to electrically plug such motors to standstill. As soon as the pressure on the handle 43 is released the spring 163 will force the mechanism to return to its normal position wherein the contacts in the all-stop switch 105 are again closed. Thus, the motor control circuits will again be established for normal cyclic operation, as will be hereinafter more fully explained.

Each of the aforedescribed switches is connected directly into the electric control circuit. Each switch serves to perform a given task in the said circuit, as will be fully described. By means of the arrangement of switches in the circuit, it is possible to predeterminately set up an operating cycle for automatic or manual control. The entire control unit is concentrated on the front of the saddle 34 where it is readily accessible for actuation manually by means of the control handle 43, or automatically by means of the selectively positioned trip dogs mounted on the front side of the table 35.

Figure 15:
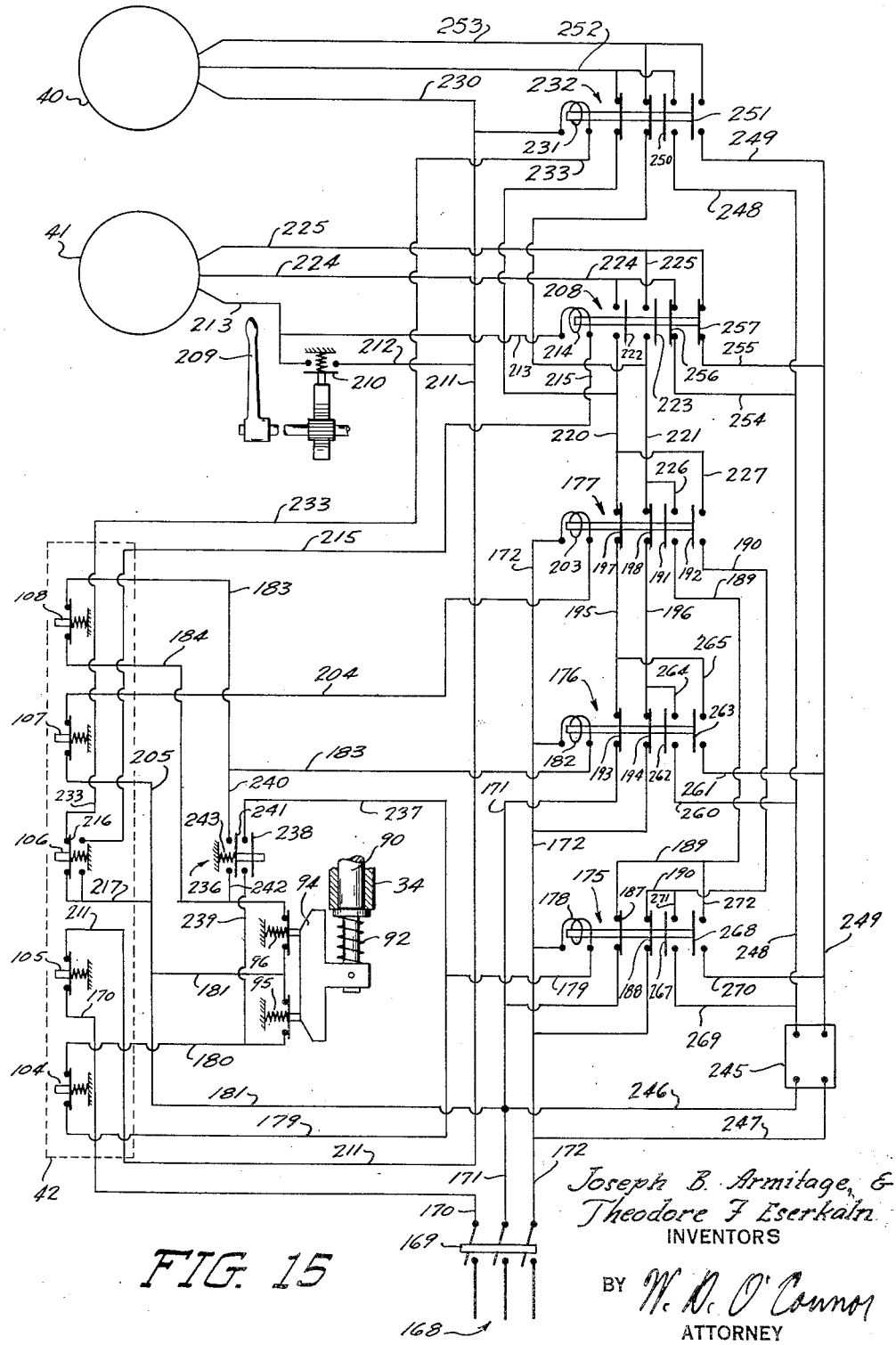
Fig. 15 is a diagrammatical showing of the electrical control circuit used to effect selective manual and automatic control of the drive motors.

As shown in Fig. 15, the electrical circuit is designed to co-ordinate the automatic or manual control of the rapid traverse and feed motors 40 and 41 from the electrical control unit 42, as indicated by the dotted panel containing the five microswitches 104, 105, 106, 107 and 108. Power is obtained from feed lines 168 through a master disconnect switch 169. The control and feed circuits are combined for direct control of current flow without a multiplicity of auxiliary circuits. The closure of the switch 169 permits current passage to main lines 170, 171 and 172. Automatic closure of three control relay switches 175, 176 and 177 occurs when the lines are energized.

In the case of the "stop" relay 175, the current flows from the line 172 through an actuating coil 178 to a line 179 connecting with one terminal of the normally closed limit switch 104. The current then flows through the switch, a line 180, and the normally closed overload switch 95 to a common return line 181 connecting with the main line 171 to effect closure of the relay switches 175. The other "stop" control relay 176 is likewise actuated to close when the main switch 169 is closed. The circuit originates from the main line 172 joined with a solenoid actuating coil 182 in the relay 176. A line 183 connecting with the coil connects with the normally closed limit switch 108 in the control unit 42, which, in turn, is connected with a line 184 connected to the normally closed overload switch 96. The circuit is completed from switch 96 via the common return line 181 to the main line 171.

The closure of the two "stop" control relays 175 and 176 permits an instantaneous current flow from the main lines 171 and 172 to the "forward-reverse" control relay 177. When the relay 175 is actuated to a closed position by the energization of the solenoid coil 178, a pair of contacts 187 and 188 therein are closed to connect the main lines 171 and 172 with lines 189 and 190, respectively. The line 189 connects with a contact plate 191 while the line 190 connects with a contact plate 192 in the "forward-reverse" relay 177. When the contact plates 191 and 192 are closed they control "reverse" energization of the rapid traverse and feed motors 40 and 41. With the "stop" control relay 176 closed by energization of the solenoid 182, the main lines 171 and 172 are connected through a pair of conductors 195 and 196, which are connected to terminals associated with contact plates 197 and 198, respectively, in the "forward-reverse" control relay 177. The closure of the contact plates 197 and 198 in the relay 177 effect "forward" energization of the rapid traverse and feed motors 40 and 41.

The "forward-reverse" control relay 177 is selectively operated to effectively energize the drive motors 40 and 41 for forward or reverse output torque from the direction switch 107 in the electrical control unit 42 on the front of the saddle 34. However, current is continuously supplied to the switch 107 as soon as the master switch 169 is closed. Current is then free to flow from the main line 172 to an actuating solenoid 203 disposed to mechanically operate the switch 177 to one of two positions. From the solenoid 203 the circuit extends through the conductor 204 to the direction switch 107. If the switch 107 has been manipulated to a closed position the circuit is completed through a line 205 and common return line 181 to the main line 171 to energize the solenoid 203. Thus, the contact plates 197 and 198 will be raised to a closed position and permit energization of either of the motors 40 or 41 for forward movement of the work table 35. However, when the directional switch 107 is opened, the circuit for energizing the solenoid 203 is broken and the "forward-reverse" control relay 177 will drop to a position, wherein the contact plates 197 and 198 are opened to break the supply lines to the motors 40 and 41 for "forward" energization while the contact plates 191 and 192 are closed to complete a circuit for "reverse" energization of the motors 40 and 41. With this setup, the control relay 177 is retained in one or the other position at all times. While the closure of the main switch 169 does not actually start either of the motors, it serves to energize the circuits to permit automatic or manual operation of the electrical control unit 42.

The feed motor 41 is controlled by a feed motor control relay 208. The operator starts the motor 41 initially by manipulating a starting lever 209 swivelably mounted on the top of the column 31, as shown in Figs. 1 and 2, in a well known manner. The movement of the lever 209 to an operating position effects a closure of a starting switch 210 (see Fig. 15). When this switch is closed, the electrical current will flow from the main line 170, through a normally closed all-stop switch 105 in the unit 42, a line 211, a line 212 and the closed switch 210 to a line 213 connecting with the feed motor 41 and with an actuating solenoid coil 214 in the feed motor relay 208. The solenoid 214 is also connected to a conductor 215 which serves to form a circuit with a terminal associated with a contact plate 216 in the double pole rate switch 106 mounted in the control unit 42. When the control unit 42 is manually or automatically manipulated to require a feed rate movement of the machine table 35, the contact plate 216 in the switch 106 is closed to complete the circuit through a line 217 and the line 181 to the main line 171.

When the circuit is completed, the feed motor solenoid relay 214 is energized to close the control relay 208 and provide line current to the feed motor 41. Thus, if the direction control relay 177 is positioned for "forward" energization of the motor, the plates 197 and 198 therein will be disposed to complete a circuit to lines 220 and 221, respectively. The lines 220 and 221 serve as conductors to the feed motor control relay 208, which, when actuated to a closed position, establishes a circuit through a pair of contact plates 222 and 223 to lines 224 and 225, respectively. Thus, the motor 41 is connected to the power lines 170, 171 and 172 and, consequently, it will operate to effect a forward movement of the table 35. The motor 41 will continue to operate until the starting lever 209 is manually operated to open the switch 210, or until the all-stop switch 105 in the control unit 42 is opened by the inward manipulation of the control handle 43, whereby the circuit from the main line 170 to the motor 41 and to the feed motor solenoid 214 is broken and the relay 208 is opened to de-energized feed motor lines 224 and 225.

The cyclic automatic or manual manipulation of the rate switch 106 may also serve to break the circuit to the solenoid 214 in the feed motor relay 208. Thus, when the trip dogs on the table 35 actuate the control unit to open the contact plate 216, or the control handle 43 is manipulated by the machine operator to effect such contact plate movement, the solenoid circuit is broken and the feed motor control relay 208 will drop to an open position, wherein the current supply to feed motor lines 224 and 225 is interrupted and the motor will stop. However, when the circuit is broken in this manner, it may be automatically or manually re-established to restart the feed motor 41.

The feed motor 41 may be reversed through the automatic or manual operation of the direction switch 107, as previously described. When the circuit for the "forward-reverse" control relay solenoid 203 is broken, the relay 177 operates to open the "forward" contacts 197 and 198 and momentarily interrupt line current flow to the feed motor relay 208 and feed motor 41 and, thereafter, to close the "reverse" contacts 191 and 192 to permit line current flow from the relay 175 and the lines 189 and 190 through contact plates 191 and 192 to a pair of conductors 226 and 227, respectively. Since conductor 226 joins with line 221 and conductor 227 joins with line 220, it will be apparent that the line terminals have been reversed and, consequently, when the feed motor circuit is again established, the direction of rotation of the feed motor 41 will have been reversed and the table 35 will be driven at feed rate in the opposite direction.

The rapid traverse motor 40 is dependent for energization upon the closure of the main switch 169 and the positioning of the rate switch 106. When the main switch 169 is initially closed, the main switch supplies current via the main line 170, the switch 105, the line 211, and a line 239 connecting with the motor 40 and an actuating solenoid coil 231 in a rapid traverse relay switch 232. The line 230 to the motor 40 is constantly energized as long as the main switch 169 remains closed, except during such times when the all-stop switch 105 may be depressed to halt the operating cycle and stop all power movement of the table 35.

When the solenoid 231 in the relay 232 is energized, the relay is actuated to a closed position. The circuit from the solenoid 231 is completed via a line 233 connecting with a second set of contact posts in the rate switch 106. Whenever the rate switch 106 is actuated to effect rapid traverse movement of the table 35, the contact plate 216 therein is positioned to complete the rapid traverse solenoid circuit from the line 233 through common return lines 205 and 181 connecting with the main line 171. As previously described, the detent mechanism 122 operative on the actuating mechanism for the rate switch 106 serves to retain the switch in the feed position or the rapid traverse position, unless it is manually operated by the operator from the control handle 43 or automatically operated by the trip dogs to effect a rate change.

An electro-mechanical overload mechanism, previously referred to and shown in Figs. 3, 5, 6 and 7, serves to actuate one of two overload switches 95 and 96 incorporated in the electrical circuit. Depending upon the direction of rotation of the table drive screw 36 when the overload occurs, the shifter rod 90 is actuated to open one of the normally closed overload switches 95 or 96. If the switch 95 is opened, the solenoid energizing circuit between lines 180 and 181 is broken and the "stop" control relay 175 will open up to break the motor feed lines and halt further "reverse" rotation of the feed or rapid traverse motors, depending upon which one is energized when the overload occurs. Likewise, when the switch 96 is opened upon the occurrence of an overload, the circuit from line 184 to line 181 is interrupted and the solenoid 182 will be de-energized to allow the control relay 176 to open. When this happens, the feed lines 171 and 172 through the relay 176 are broken and further "forward" rotation of one of the motors will be halted. Since the master switch 169 remains closed, the circuits will be reestablished as soon as the cause of the overload is removed.

In order to permit the machine operator to effect an overtravel beyond the selected limits of the operating cycle, an overriding switch 236 is introduced into the circuit, whereby the operator may energize one of the motors for short intervals after the trip dogs have opened one of the limit switches 104 or 108 and halted further movement of the table 35 in a given direction. Normally, when the limit switch 104 is opened, the solenoid circuit from the solenoid 178 in the control relay 175 is broken and further leftward movement of the table 35 is stopped. However, if the operator wishes to effect further leftward movement, he would merely depress the overriding switch 236, as shown in Figs. 1, 2, 3 and 15, to temporarily reestablish the circuit. Thus, a solenoid circuit would then be established from the solenoid 178 through the line 179, a line 237, a contact plate 238 in the switch 236, and a line 239 which connects with the line 180; the circuit is completed, as before, from the line 180 through the overload switch 95 and the line 181 to the feed line 171. The energization of the solenoid 178 serves to actuate the relay 175 to a closed position and energize one of the drive motors 40 or 41 until the operator no longer depresses the switch 236 and permits it to resiliently reopen to break the solenoid circuit.

During rightwardly movement of the table 35, the extreme limit of movement is preselected and occurs when the limit switch 108 is opened by a trip dog, as heretofore described in detail. If it is necessary to have additional travel beyond such a selected point, the operator may again depress the overtravel switch 236. Thus, the circuit for the solenoid 182 will be reestablished via the line 183, a line 240, a contact plate 241 in the switch 236 and a line 242 joining with the line 184 which, in turn, connects with the main line 171 through the overload switch 96 and the line 181. Such additional rightward travel of the table will continue as long as the overtravel switch 236 remains closed. As a safety feature, the overtravel switch closure is effected against the pressure of a spring 243 so that it will reopen instantly when released to break the solenoid circuit.

For precision machine tool operation, it is necessary that the driving force imparted to a movable machine element, such as the work retaining table 35, be accurately controlled and that all movement at a selected rate of travel be stopped at a desired instant. This is accomplished in the present disclosure by means of electrical plugging of the motors 40 and 41. Direct current for this purpose is supplied by a rectifier 245 which is connected to the main lines 171 and 172 by means of lines 246 and 247, respectively. The direct current is conducted by lines 248 and 249 to a pair of contact plates 250 and 251 in the rapid traverse motor control relay 232. Whenever the relay is opened, the plates 250 and 251 close to permit direct current passage from lines 248 and 249 to lines 252 and 253, respectively, and on to the rapid traverse motor 40 to plug the same to standstill. Such plugging occurs on each occasion when the motor relay 232 is opened by opening the all-stop switch 105, or by shifting the control mechanism from a rapid traverse rate demand to a feed rate demand.

Likewise, the feed rate motor 41 is protected in the same manner. The direct current is continuously fed from the rectifier 245 via lines 248 and 249 and lines 254 and 255 to contact plates 256 and 257, respectively, in the feed motor control relay 208. Whenever the solenoid 214 therein is deenergized, the relay 208 opens to break the feed circuit to the feed motor 41 and closes the contacts 256 and 257 to feed the direct current from contacts 256 and 257 to motor lines 224 and 225, respectively, connecting with feed motor 41. Thus, the motor 41 is braked to standstill whenever the control relay 208 is opened through the actuation of the all-stop switch 105 to an open position, or by the operation of the rate switch 106 from a feed rate to a rapid traverse rate position.

The above described braking control for the rapid traverse and feed motors 40 and 41 is operative only when the respective motor control relays 208 and 232 for these motors are opened. However, in order to insure precise control of the movement of the table at its extreme limits of travel, the electrical brake control is also used to halt table movement precisely at a preselected limit of travel. The motor control relays 208 and 232 are not opened to break the feed circuit to the motors at this time, but, as aforedescribed, the "stop" control relays 175 and 177 are opened instead to effect this control. Thus, for example, if the control relay 176 is closed and the direction control relay 177 is positioned for "forward" energization, as shown in Fig. 15, either the rapid traverse motor 40 or feed motor 41 will be energized to effect forward rotation of the motor and drive mechanism. Since the diagram shows the rapid traverse control relay closed, the rapid traverse motor 40 is energized to drive the table at rapid traverse rate. When a trip dog adjustably mounted on the table 35 actuates the limit switch 108 at some point of travel, the solenoid circuit for the control relay 176 will be broken and the relay will open to break the feed circuit to the rapid traverse motor 40. As the relay 176 opens, it closes a brake circuit from the direct current lines 248 and 249 and lines 260 and 261, through closed brake contact plates 262 and 263 and lines 264 and 265 connecting with the motor feed lines 195 and 196. With the feed circuit for the motor broken by the open plates 193 and 194 in the open control relay 176, the direct current will be fed through the closed direction control relay 177 and closed rapid traverse control relay 232 to brake the rapid traverse motor 40 to standstill. In this manner, table movement to the right at rapid traverse rate would be halted almost instantly at the selected point of travel. If instead, the operating cycle had been set for rightward table movement at feed rate, the direct current would have been directed to the feed motor 41 in the same manner to brake the feed motor to standstill.

Assuming an operating cycle wherein the direction control relay 177 was opened to permit a feed circuit through "reverse" contacts 191 and 192 and the feed motor control relay 208 was energized, the feed motor 41 would be energized to rotate in a "reverse" direction and effect leftwardly movement of the table 35. If at some selected point in the operating cycle a trip dog on the table 35 actuates the limit switch 104 in the control unit 42, the solenoid circuit for the control relay 175 will be interrupted and the relay will open to break the feed circuit to the feed motor 41. Instantly upon the opening of the relay 175, a set of brake circuit contact plates 267 and 268 will be closed to permit the direct current to flow from lines 248 and 249 via lines 269 and 270 through the closed contacts 267 and 268 to lines 271 and 272 connecting with feed lines 190 and 189, respectively. Since the feed line circuit is broken by the opening of the control relay 175, the brake circuit will be supplied to the feed motor 41 through the direction control relay 177 and the closed feed motor control relay 208. The feed motor will be braked to standstill and immediately halt leftwardly movement of the table 35 at feed rate. It should be remembered that if the operating cycle had been set up for leftwardly movement of the table at rapid traverse rate, the limit control, as aforedescribed, would have operated in the same manner to brake the rapid traverse motor 40 to standstill and halt leftwardly movement of the table.

From the foregoing description of the electrical control mechanism interconnected to control two drive motors, it is apparent that a system of control has been devised to precisely and accurately set up an electrically co-ordinated operating cycle for a machine tool member. The member can be made to perform the same movement repeatedly at a variety of feed and rapid traverse rates without any deviation whatsoever. In this manner, the limits of machine tool element movement can be precisely set and considerable reductions in the length of the operating cycle will result.

A modified version of the invention is schematically shown in Fig. 16. In this case, separate motors are again used for the rapid traverse and feed drives of a movable machine tool member. An electric control system which is manually operable by the machine operator or automatically operable through engagement with a series of trip dogs carried on the movable member, readily permits a greater versatility in machine tool control than has heretofore been possible in the conventional type machine. In the particular instance, the invention is shown incorporated in a knee type milling machine, wherein the table 35 is mounted for longitudinal movement on a saddle 34, which, in turn, is slidably mounted for transverse movement on the knee 32. While the power drive is shown to drive the table 35, it would be possible to operate any machine tool member, or plurality of members, in a similar manner.

The power driven mechanism for the movable machine tool element is a self-contained unit carried in the movable knee 32 of the milling machine. A freed drive motor 280 and a rapid traverse drive motor 281 are mounted within the knee 32 to provide a selective feed drive and rapid traverse drive to the table 35. A tool retaining spindle 282 rotatably mounted in the column of the machine in a well known manner, is driven by a spindle drive motor 283 through a reversing mechanism 284 and a variable speed transmission 285. The operation of the three motors is electrically coordinated in a manner to be hereinafter more fully described.

The feed motor 280 is disposed to drive a pair of pick-off gears 286 and 287, constituting a pick-off gear transmission conveniently contained in the front of the knee 32 for ready accessability. A plurality of feed rates for the table 35 is provided by interchanging the pick-off gears within the transmission in a well known manner. The gear 287 is splined to a shaft 288 which is journalled within the knee 32. A worm 289 is keyed to the shaft 288 and is disposed to mesh with a worm wheel 290, carried on the end of a differential gear shaft 291, constituting part of a differential element 292 operably mounted in the saddle 34 of the milling machine. The differential 292 is also driven from the rapid traverse motor 281. Since the rapid traverse rate provided for the table 35 is constant, a permanent gear train 295 is provided from the motor 281 to a shaft 296 journalled in the knee 32. The shaft 296 is keyed to drive a worm 297 mounted thereon and a worm wheel 298 meshing therewith. The worm wheel 298, in turn, is keyed to and drives a differential shaft 299, likewise constituting a part of the differential 292.

Both of the differential shafts 291 and 299 are journalled within a differential carrier 301. A bevel gear 302 is integrally formed on the inner end of the differential shaft 291, while a bevel gear 303 is formed on the inner end of the shaft 299. Both of the gears 302 and 303 mesh with spider gears 304 and 305 rotatably mounted in the differential carrier 301. The differential 292 is disposed to be driven from either the feed motor 280 or from the rapid traverse motor 281 selectively, with the electric control being arranged to energize either one or the other of the two motors at a given instant.

The leftwardly drive train from the differential 292 is constituted by a ring gear 306 attached to the periphery of the differential carrier 301. The gear 306 constantly meshes with an idler gear 307, which, in turn, meshes with a gear 308 rotatably mounted on a table screw shaft 309. The rightwardly drive train, from the differential 292, is constituted by a ring gearing 310 fixedly carried on the carrier 301 and which meshes with a gear 311 rotatably carried on the table screw shaft 309. The power drive from the gear 308 or from the gear 311, may be selectively completed to the table screw shaft 309 through a clutch mechanism 312. The clutch mechanism 312 is of a well known type, whereby axial positioning of a clutch collar therein, to one of three positions, serves to selectively complete or disconnect the drive trains. Thus, when the clutch mechanism 312 is shifted leftwardly, the gear 308 is connected to drive the screw shaft 309 at feed or rapid traverse rate to effect leftward table movement, and when the clutch mechanism 312 is shifted rightwardly, the gear 311 is connected to drive the screw shaft 309 at feed or rapid traverse rate to effect rightward table movement. If the clutch mechanism is positioned centrally between the two gears, both of the clutch mechanisms are disconnected and the table 35 will not be power driven. The advantage of the aforedescribed driving mechanism is that it is extremely compact and reduces the number of operating parts to a minimum.

The main advantage gained from this arrangement is that an electric control system can be employed to coordinate the energization of the motors to provide a precise cycle of operation for the machine tool table 35 for high speed production work. Because of the degree of precision in cyclic movements of the table according to any predetermined combination of operating cycles, the length of the operating cycle is reduced to lower production cost.

Figure 20:
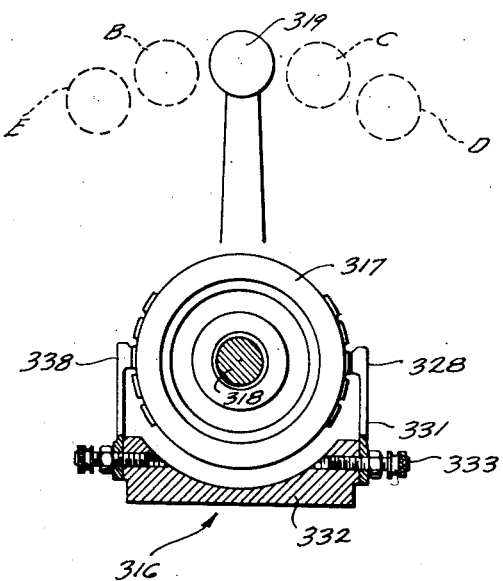
Fig. 20 is an enlarged view of the control drum switch shown in Fig. 16 with the various positions of the switch indicated by dotted lines.

Automatic or manual control of the motors is effected through the operation of a control unit 316 mounted on the saddle of the machine. The power drive control of the movable table 35 is effected from this single control unit, which is similar in purpose to the electric control unit 42 aforedescribed. Manual or automatic control of the movements of the table 35 at either feed or rapid traverse rates in either direction may be effected from the single control station 316. The control unit 316 comprises essentially a rotatable contact drum 317, Fig. 17, keyed to a shaft 318 appropriately journalled and having a control lever 319 attached to its outer end. Manual control of the table operation is afforded by manipulating the control handle 319 to one of five positions. The handle 319 is shown in Figs. 16 and 20 in the vertical neutral position. Movement of the handle to the right from that position, serves to effect the rightward movement of the table while movement to the left of the neutral position serves to effect leftwardly movement of the table at feed or rapid traverse rates selectively, as will be hereinafter more fully described.

Figure 17:
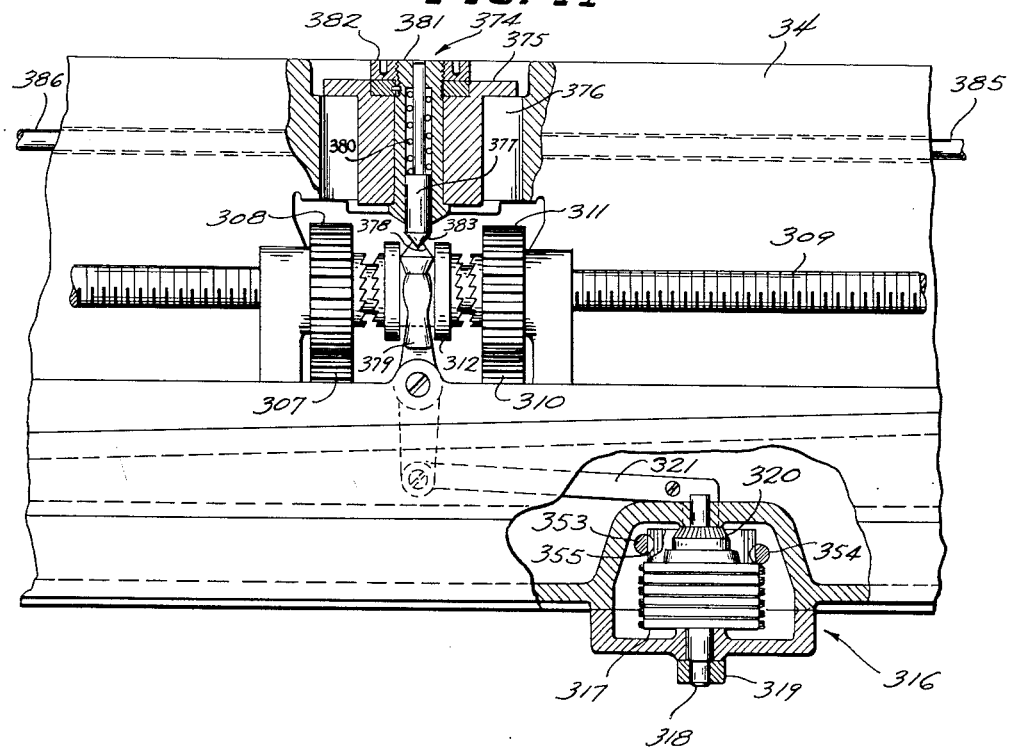
Fig. 17 is a horizontal view partly in section through the saddle, showing the table screw drive mechanism and the control mechanism for operating the clutch and driving motors.

The rotation of the shaft 318, serves to rotate a gear segment 320 attached to the inner end thereof, as shown in Fig. 17. The gear segment is connected to a linkage mechanism 321 connecting with the reversing clutch mechanism 312, whereby movement of the control handle 319 to the left serves to shift the clutch 312 to the left into engagement with the gear 308 and to provide a power connection for driving the table 35 leftwardly. Movement of the handle 319 to the right, serves to effect a rightwardly movement of the clutch 312 by means of the linkage mechanism 321, whereby the clutch is brought into engagement with the gear 311 to provide a power drive train for driving the table 35 rightwardly.

Figure 19:
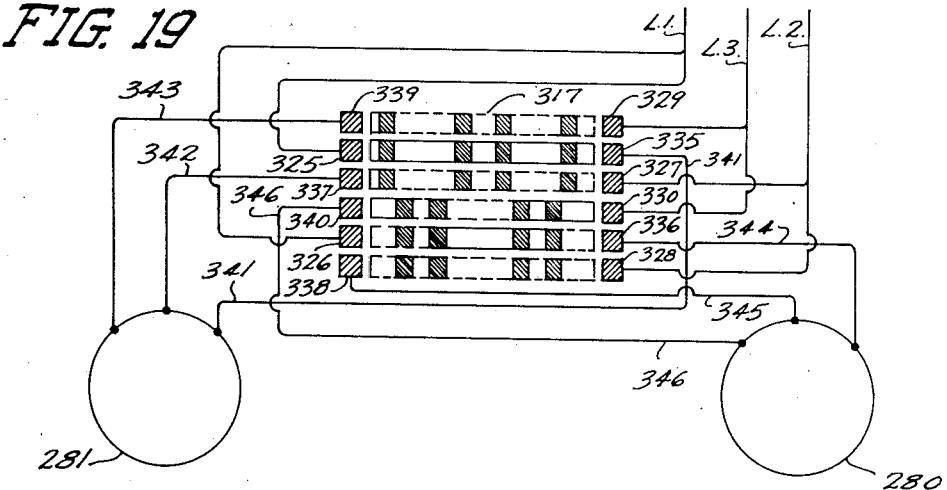
Fig. 19 is a diagrammatic showing of the electrical connections from the motors to the control drum switch.

The contact drum 317 in the electric control unit 316 is disposed to complete the electric circuit to either of the two drive motors 280 or 281. The drum is constructed of a nonconducting material and is provided with a plurality of contacting strips variously disposed to provide a series of contacts on the peripheral surface of the drum, as shown in Fig. 19. The development of the contact strips is indicated in the drawing to clearly show the means of conducting the electrical current from supply lines L1, L2 and L3, to the motors. When the master switch 324 shown in Fig. 16 is closed, the supply line current will flow to six flexible contact arms. Thus, the current from line L1 will flow to contact arms 325 and 326, while current from supply line L2 will flow to contact arms 327 and 328 and current from supply line L3 will be directed to contact arms 329 and 330, as shown in Fig. 19. Each of the supply line contact arms is disposed to ride on one of six annular contact surfaces on the drum 317. A mating contact arm for each of the six supply line arms is likewise disposed to engage its respective contact surface on the drum 317. As shown in Fig. 20, the second set of contact arms is disposed to engage the drum 317 at a point directly opposite the point of engagement of the supply line contact arms. Each of the contact arms is constituted by a flexible strip 331, mounted on a nonconducting terminal block 332 by means of a terminal post 333. Sufficient tension is placed on each of the contact arms to cause the contacts to engage its respective contact surface on the drum 317.

As shown in Fig. 19, the supply line contacts 325, 326, 327, 328, 329 and 330 are each disposed to provide a current supply to one of the motor contact arms 335, 336, 337, 338, 339 and 340, respectively. The motor contact arms 335, 337 and 339 are connected to conductors 341, 342 and 343, respectively, which serve to carry current to the rapid traverse motor 281. The motor contacts 336, 338 and 340 are connected to conductors 344, 345 and 346, respectively, which serve to conduct current to the feed motor 280. The control unit 316 also provides a circuit to spindle motor conductors 348, 349 and 350, which serve to energize the spindle motor 283 whenever the feed motor 280 is energized, as indicated in Fig. 16. With this arrangement, it is impossible to feed a workpiece mounted on the table 35 into a non-rotating cutter at feed rate, since the cutter spindle 282 will always be driven when the feed motor 280 is operating to drive the table 35.

With the arrangement of contact surfaces on drum 317 indicated in Fig. 19, it is possible to complete a motor circuit when the drum is rotated to any one of four positions. Thus, when the control handle 319 is moved from the neutral position to position B shown in Fig. 20, a motor circuit to the feed motor 280 will be completed by contacts 326, 328, 330, 336, 338 and 340. At the same time, the movement of the handle 319 will effect a positioning of the clutch mechanism 312 to provide leftwardly movement of the table. Thus, the table 35 will be power driven at feed rate to the left. If the handle 319 is moved to position C, a second set of contacts on the surfaces of the control drum 317 will likewise complete a circuit to the feed motor 280, but the movement will serve to shift the clutch mechanism 312 rightwardly into engagement with the gear 311, whereby rightwardly movement of the table will be provided at feed rate.

The rapid traverse motor 281 may be energized to drive the table 35 in either direction at rapid traverse rate, by shifting the control handle 319 to either position D or E, as indicated in Fig. 20. When the handle is shifted to position D, the rapid traverse motor 281 is energized via contact arms 325, 327, 329, 335, 337, and 339, and the clutch mechanism 312 will be positioned to provide rightwardly movement of the table at rapid traverse rate. If the table 35 is to be driven leftwardly at rapid traverse rate, the handle 319 must be shifted to position E, where a second set of drum contacts will likewise serve to complete a circuit to the rapid traverse motor 281, but the clutch mechanism 312 will have been shifted to effect leftwardly movement of the table. Thus, it is evident that the complete manual control of the table movement is possible merely by shifting the handle 319 to one of five positions.

The movable table 35 may be operated automatically to perform an operating cycle as required for a particular milling operation. The control unit 316 may be mechanically operated for this purpose by means of a series of trip dogs carried in a T-slot 352 on the front face of the movable table, as shown in Fig. 16. At various points of table travel, the trip dogs are disposed to operate the control unit in a manner similar to that aforedescribed for manual control.

The mechanism for operating the control unit 316, consists of a pair of vertically disposed plunger rods 353 and 354, shown in Figs. 16 and 17, slidably mounted in the saddle 34 for axial movement and operative upon a spur gear 355 fastened to the inner end of the contact drum 317. Rack teeth machined on one side of each of the plungers 353 and 354, are designed to mesh with the teeth on the gear 355 when axial pressure is imparted to either of the plungers 353 or 354. The drum may be rotated in a clockwise or counter-clockwise direction depending upon the point of pressure application upon the rods. The upper end of each of the plungers is tapered to permit ready engagement with the trip dogs. When both of the plungers are positioned to place their respective tops in an even plane, the control handle 319 in the control unit 316 will be in a neutral position and feed or rapid traverse power movement in either direction will not be possible. At this time, the table 35 can be manually operated by attaching a crank to the squared right end of the table screw 309 and operating it in a well known manner. With the plungers in the neutral position, all of the trip dogs carried in the T-slot 352 will be rendered ineffective, since they will not engage the plungers.

If an automatic operating cycle is required, the operator must predeterminately adjust a series of trip dogs mounted on the table 35, in a well known manner. As shown in Fig. 16, a dog 358 serves to engage the end of plunger 353 and force it downwardly to the neutral position to stop any rightward movement of the table at feed rate. A second stop dog 359 serves to operate in a like manner upon the plunger rod 354 to halt leftwardly movements of the table at feed rate. Feeding movement of the table will consequently stop whenever the dogs 358 or 359 engage the plungers 353 or 354, respectively, regardless of whether or not the feeding movement was initially instituted by the manual manipulation of the control lever 319 or automatically by one or the other trip dogs. Leftwardly movement of the table 35 at rapid traverse rate may be stopped by a rapid traverse stop dog 360. When the control element 316 is set to effect leftward movement of the table, the automatic plunger 354 is in a raised position, while the plunger 353 is retained in a lowered position. At some predetermined point of travel, the dog 360 will engage the beveled tip of the plunger 354 and depress it sufficiently to return the control lever 319 and its associated mechanisms to a neutral position and, consequently, halt further movement of the table at rapid traverse rate. In a similar manner, rightward movement of the table 35 at rapid traverse rate may be halted through the automatic engagement of a rapid traverse stop dog 361 with the tip of the plunger 353. When this occurs, the plunger is likewise depressed to actuate the control unit and disconnect the rapid traverse motor 281. As shown in Fig. 17, the plunger rods 353 and 354 are disposed in different vertical planes to permit overtravel of one set of stop dogs into the actuating zone of the other plunger. Thus, the stop dog 360 can only engage the plunger 354 to halt leftwardly movement of the table at rapid traverse rate, while the dog 361 can only engage the plunger 353 to halt rightwardly movement of the table at rapid traverse rate. In any case, when one of the stop dogs 358, 359, 360 or 361 engages the plungers 353 or 354, the contact drum 317 is rotated to a neutral position wherein one of the motors 280 and 281 is disconnected from the supply lines. Further power movement of the table can be reinstituted by shifting the control lever 319 to one of the four driving positions.

In certain types of operating cycles, it may be advisable to operate the table in a given direction at rapid traverse rate until the workpiece is brought up to the cutter and thereafter operate the table at feed rate while the cutter is operating upon the workpiece. In order to effect a change in rate of travel, such as from rapid traverse rate to feed rate, a pair of trip dogs 363 and 364 are provided. These dogs may be selectively positioned in the T-slot 252 on the table 35 to engage the trip plungers 353 and 354 at a desired point of table travel. The rate dog 363 is formed to operate with the trip plunger 353 in the control mechanism 316 while the rate dog 364 is formed to operate with the trip plunger 354. A resiliently retained engaging trigger 365 mounted on each of the rate dogs 363 and 364 serve to engage the trip plungers and effectively depress one of them from the uppermost rapid traverse position to an intermediate feed rate position during the forward movement of the table. During the return cycle of table movement, the springular mounting of the trigger 365 permits them to be momentarily swung out of the actuating position when the trip dogs pass their respective plungers 353 and 354. Thereby, the position of the plungers are not changed during this portion of the table travel.

For effecting a change in rate from feed to rapid traverse, a second set of rate trip dogs 367 and 368 are provided for selective mounting on the front of the table 35 as aforedescribed. These dogs serve to raise their respective trip plungers from the intermediate feed rate position to the uppermost rapid traverse rate position. Each of the dogs is provided with a springularly retained engaging trigger 369 which serves to actuate the associated control plunger during the forward movement of the table and which is rendered ineffective upon engagement with the plunger during the return movement of the table to complete an operating cycle. As shown in Fig. 16, the trigger on the dog 367 is provided with a forwardly extending inclined lug 370, which is disposed to engage a similarly inclined lug 371 extending rearwardly from the back side of the plunger rod 353. The engagement of the two inclined surfaces forces the plunger 353 upwardly and, consequently, effects clockwise rotation of the contact drum 317. When this occurs, the rightwardly movement of the table 35 at feed rate would be stopped and immediately thereafter the rapid traverse motor 281 would be energized to continue such rightwardly movement at rapid traverse rate.

The rate dog 368 has a rearwardly extending lug 372 with an inclined engaging surface which is disposed to engage a similar lug 373 integrally formed on the top front side of the trip plunger 354, as viewed in Fig. 16. When the inclined surface of the lugs meet at some predetermined point of table travel, the trip plunger 354 is forced upwardly from the feed rate position to the uppermost rapid traverse rate position. The upwardly axial movement of the plunger 354 will cause the contact drum 317 to be rotated counter-clockwise, whereby the electric circuit to the feed motor 280 will be interrupted and the circuit to the rapid traverse motor 281 will be completed. Thus, the leftwardly movement of the table 35 at feed rate will be stopped and immediately thereafter the leftwardly movement of the table will be continued at rapid traverse rate.

Figure 18:
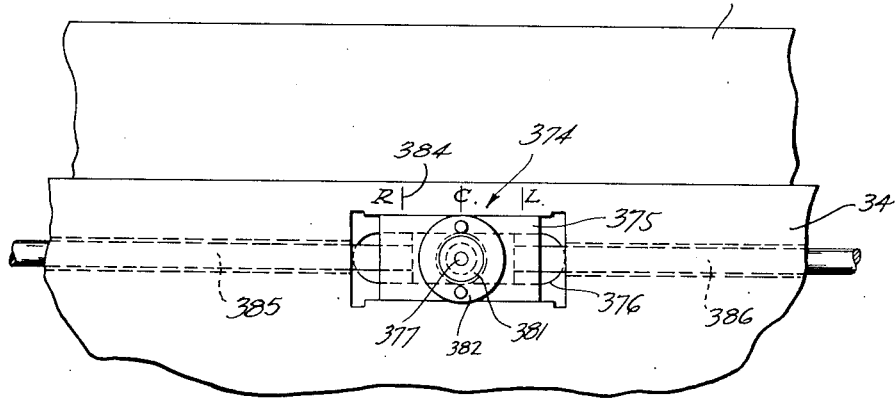
Fig. 18 is a fragmentary elevational view of the rear of the table and saddle showing the detent mounting constituting part of the control mechanism operably mounted in the saddle of the machine.

In order to effect an automatic reversal in direction of table travel, a selectively positionable detent mechanism 374 is disposed to effectively shift the clutch mechanism 312. As shown in Figs. 17 and 18, the detent mechanism 374 is adjustably mounted in the saddle 34. A frame 375 is mounted for horizontal movement in an elongated opening 376 in the saddle. The detent mechanism is carried in the frame 375 in a manner to present a detent plunger 377 slidably carried therein to the horizontal plane of operation of cam surface 378 formed on the extending end of a shifter fork 379 disposed to operate the clutch mechanism 312. The plunger 377 is retained in contact with the cam surface 378 by means of a spring 380 which abuts against the plunger and against a retaining sleeve 381 mounted in the frame 375 and locked in position by means of a lock nut 382. When the detent mechanism is centrally disposed in the saddle cavity, the tapered end of the detent plunger 377 will ride in a centrally disposed notched portion 383 of the cam surface 378 when the clutch 312 is retained in the neutral position.

If we assume an operating cycle in which the table is initially driven leftwardly at rapid traverse or feed rate and, thereafter, returned rightwardly to the starting position, the rapid traverse stop dog 360 will be positioned predeterminately to engage the trip plunger rod 354 and force it downwardly to a neutral position, and thereby stop the table travel to the left at a given point of travel. In setting up the operating cycle, the frame 375 supporting the detent plunger 377 must be positioned so that the axial center of the detent plunger 377 is shifted slightly to the left of the notched portion 383 of the cam 378. Just before the control mechanism is operated to effect reversal through the engagement of the dog 369 with the trip plunger 354, the clutch teeth on the clutch mechanism 312 will have been meshed with the teeth on the side of the gear 308 to effect leftward movement of the table. As the dog forces the plunger 354 downwardly to shift the control mechanism to a neutral position, a linkage mechanism 321 operating the shifting fork 379 will function to shift the clutch 312 to the intermediate or neutral position between the two gears. However, at this instant the spring 380 supporting the detent plunger 377 will be compressed as the plunger is forced out of the notched portion 383 of the cam 378. The spring pressure will be sufficient to impart continued sidewise force to the shifter fork 379 and the clutch mechanism 312. Such additional movement of the clutch mechanism will be sufficient to bring the clutch teeth thereon into mesh with the clutch teeth on the gear 311 and, consequently, the drive train will be completed to effect rightwardly movement of the table at either feed or rapid traverse rate, depending upon the requirements of the operating cycle. After the table 35 has been returned to its initial starting point, one of the stop dogs will serve to engage one of the plunger rods 353 or 354 to shift the control mechanism 316 to the neutral position, as aforedescribed, and halt further movement of the table. The detent mechanism 374 will not be rendered operable at this point of the operating cycle, when preset as described, because the action of the detent plunger is designed to aid only rightward movement of the clutch mechanism.

If we next assume an operating cycle wherein the table movement is to the right at either feed or rapid traverse rates, or any selected combination thereof, and with the return movement to the left, it is necessary to effect a reversal at the predetermined limit of rightward movement. With one of the stop dogs predeterminately set to engage the trip plungers in the control unit 316 and to actuate them to the neutral position when the table reaches this point of travel, the drive motors 280 and 281 will be de-energized and the shifter fork 379 will be actuated to move the clutch mechanism 312 to the central neutral position, as shown in Fig. 17. When this occurs, the rightwardly movement of the table is immediately stopped. In setting up the operating cycle for an automatic reversal at this time, the operator will have positioned the detent mechanism 374 slightly to the right of the center line of the notched portion 383 on the cam surface 378 when the clutch 312 is in the neutral position, as viewed in Fig. 17. Appropriate indicia 384 is marked on the rear face of the frame 375 and on the adjoining face of the saddle 34 to aid the operator in setting the detent mechanism, as shown in Fig. 18. The movement of the detent frame 375 and the associated mechanism is effected manually by adjusting two screws 385 and 386, fixedly retained in each end of the frame 375 and disposed in bored passages within the saddle 34. The outer end of each of the screws 385 and 386 extends beyond the end of the saddle 34 and presents a threaded portion (not shown) upon which an adjusting nut (not shown) is mounted. Thus, the operator can effect endwise movement of the detent mechanism 374 in a horizontal plane in a given direction by loosening one of the lock nuts and tightening the other until the indicia 384 signifies the desired position of the detent mechanism required for a given operating cycle.

When the detent mechanism 374 is shifted rightwardly to effect an automatic reversal of table travel from the right to the left, the tip of the detent plunger 377 will ride in the notched portion 383 of the cam surface on the fork 379, while it is positioned in engagement with the clutch teeth on the gear 311 to effect rightwardly movement of the table 35. When one of the stop dogs actuates the control mechanisms 316 to a neutral position, the detent plunger 377 will be forced upwardly from the position shown in Fig. 17 to compress the spring 380, as the tip of the plunger leaves the notch 383 during the leftward movement of the clutch 312 to the neutral position. As the tip of the plunger rides along the inclined surface on the right half of the cam 378, the spring pressure will be sufficient to impart additional impetus to the fork 379 and the clutch mechanism 312 operably associated therewith. Thus, the clutch mechanism 312 will be moved beyond the central neutral position into mesh with the clutch teeth on the side of the gear 308 to complete the gear train for driving the table 35 to the left and complete the return portion of the operating cycle. The table will continue to move leftwardly until a predeterminately positioned stop dog again actuates the control mechanism 316 to a neutral position, whereupon either of the drive motors 280 and 281 will be de-energized and the clutch 312 shifted to a neutral position to terminate the operating cycle. Succeeding automatic cycles can be initiated through the manual manipulation of the control lever 319, as aforedescribed.

An auxiliary set of stop dogs 388 and 389, as shown in Fig. 16, are adapted to actuate the control unit trip plungers 353 and 354 to a neutral position, in the same manner as the rapid traverse stop dogs 360 and 361. The stop dogs 388 and 389 can be used when the positioning of the trip dogs in the T-slot on the front of the table 35 is such that there is not sufficient room to use the standard type of rapid traverse stop dog, such as dogs 360 and 361. Such would be the case when the distance of the various operating cycles is very short, as might occur while milling comparatively small workpieces. The dog 388 is provided with a rearwardly extending lug 390, which is disposed to engage the lug on the depressed plunger rod 354, during rightwardly movement of the table 35. The auxiliary stop dog 389 is likewise provided with a lug 391, which extends forwardly to engage the depressed trip rod 353 during leftward movement of the table. Thus, it is evident that these dogs while serving to return the plungers 353 and 354 to a neutral position operate oppositely from the standard rapid traverse stop dogs 360 and 361 in that they engage the opposite plunger which is depressed during a given portion of the operating cycle and force the plunger upwardly to the neutral position.

While the automatic control mechanism incorporating a modified version of the invention is shown and described as driving the work retaining table of a milling machine, it is possible to use the same feed and rapid traverse drives to power operate other movable members of the machine, such as the knee 32 and the saddle 34. It would also be possible to drive such additional members with individual feed and rapid traverse mechanisms, as aforedescribed, with an appropriate control mechanism, such as the unit 316 serving to unify the control of several drive mechanisms.

A second modified form of the invention is shown in Figs. 21, 22, 23 and 24, as incorporated in a bed type milling machine. This modification includes the basic principle of the invention in that separate drive motors are used to drive a work retaining member of the milling machine at rapid traverse and feed rates selectively. While this modification is shown adapted to a bed type milling machine, it should be remembered that the application thereof may be readily adapted to effect movement of a work or cutter retaining member on various other types of machine tools, including lathes, grinders and drill presses.

As shown in Fig. 21, the bed type milling machine is comprised of several structural members, including a bed or base 401, a pair of uprights 402 and 403 slidably mounted on the base for horizontal movement and supported by a cross member 404 to present a cutter supporting spindle block 405 in operable relationship to a table 406; the latter slidably mounted in a saddle 407 which is fixedly carried on the base. The table 406 is disposed to reciprocally present a workpiece (not shown) clamped thereon to a cutter 408 in a manner well known to milling machine practice. The spindle block 405 is slidably carried between the two upright supports 402 and 403 to permit a vertical adjustment of the spindle block assembly. In this manner, the relationship of the cutter to the workpiece can be readily adjusted in one of several planes. Thereafter, the spindle block assembly 405 is locked in position by means of a clamping mechanism contained within the block and uprights by tightening a bolt 409 associated therewith and extending from the side of the upright 402.

As diagrammatically shown in Fig. 24, the cutter 408, mounted in a spindle 410 journalled in the spindle block 405, is driven from a spindle motor 412 mounted within the bed 401. The motor is disposed to drive a pick-off gear transmission 413, which, in turn, drives various gearing 414 connecting with the spindle 410. The spindle is power driven at a desired speed regardless of the vertical position of the spindle block 405. A set of interchangeable pick-off gears is provided for use in the pick-off gear transmission 413 to permit the operator to selectively change the speed rate of the spindle 410 and cutter 408 in a well known manner. The usual mechanical reversing mechanism is not used because reversal of the spindle 410 is effected electrically by reversing the direction of rotation of the motor 412.

Referring to Figs. 21, 22, 23 and 24, the table 406 is selectively driven at one of a plurality of feed rates by a motor 418 mounted in an enclosed compartment within the bed 401. A pick-off gear 419 mounted on a motor armature shaft 420 is disposed to mesh with a second pick-off gear 421 mounted on an idler shaft 422. Another gear 423, mounted on the idler shaft meshes with a pick-off gear 424, interchangeably mounted on the end of shaft 425. All of the aforementioned gears are readily accessible through a hinged door 426 on the front of the bed 401. By interchanging the position of the gears on the various shafts or by substituting other gears in a well known manner, the shaft 425 connecting with the table feed drive mechanism may be driven at any one of a plurality of speeds.

An automatic spring loaded clutch mechanism 429 is driven by the shaft 425 and serves to disconnect the driving train and protect the transmission gears and motor upon the occurrence of excessive torque in the table drive mechanism, such as might occur when the cutter is stalled while engaging the workpiece. The clutch mechanism 429 transmits power to a shaft 430 shown in Fig. 23, which is journalled within the bed 401. A worm 431 integrally formed on the end of the shaft, meshes with a worm wheel 432 fixedly keyed on the end of a shaft 433.

A differential mechanism 435, as shown in Figs. 21 and 24, is operably mounted in the saddle 407. The differential mechanism 435 is similar to the differential mechanism 292 previously described in connection with the first modified form of the invention. By means of the differential it is possible to unify the feed and rapid traverse drives into a single driving train to effect a power drive to the table 406. The differential includes a carrier 436 having a pair of sleeves 437 and 438 integrally formed therewith and journalled in the saddle 407. The carrier 436 has a gear 439 machined on its outer periphery which meshes with a gear 440 rotatably journalled in the saddle 407. The gear 440 is slidably keyed to a table screw 441 rotatably journalled in a pair of table brackets 442 and 443 fastened to the ends of work retaining table 406. Thus, selective rotation of the carrier gear 439 and the gear 440 is transmitted to the table screw shaft 441. Since the table screw is threadedly retained in a nut 444 anchored in the saddle 407, the rotation of the table screw 441 will cause the table 406 to move longitudinally upon the saddle 407.

The shaft 433 carrying the worm wheel 432 is journalled within the sleeve 437. A pinion gear 447, integrally formed on the end of the shaft 433, meshes with a pair of spider gears 448 and 449, each rotatably journalled within the carrier 436. Each of the spider gears 448 and 449 also meshes with a second pinion gear 450 on the end of a shaft 451 journalled in the carrier sleeve 438. Whenever the feed motor 418 is energized, the feed train is driven to effect rotation of the differential mechanism 435 at a selected speed and, consequently, the table 406 will be driven at a desired feed rate. A change in direction of travel of the table 406 is effected electrically by changing the direction of rotation of the feed motor 418. Thus, the usual mechanical reversing mechanism is eliminated from the table drive mechanism.

The table 406 may also be power driven in either direction at rapid traverse rate through energization of rapid traverse motor 455. As shown in Figs. 21 and 22, this motor is mounted within the bed 401. A worm 456 is keyed directly to the end of motor armature shaft 457. The worm 456 meshes with a worm wheel 458 fixedly carried on the end of the shaft 451. The energization of the rapid traverse motor 455 serves to effect rotation of the shaft 451 and gear 450 within the differential carrier 436 (see Figs. 21 and 24). The gear 439 on the periphery of the carrier will be driven at a fixed rapid traverse rate and, consequently, the table 406 will be driven at a rapid traverse rate. The electric control of the motors 418 and 455 is such that only one of the motors can be energized to drive the table 406 at a given instant. Thus, when the motor 455 is energized, the feed motor 418 is deenergized and, consequently, the gear 447, within the differential 435 driven by the feed motor, will not be rotating. When the rapid traverse motor 455 is energized to drive the pinion gear 450, the spider gears 448 and 449 meshing therewith will be driven at a fixed rapid traverse rate about the then stationary pinion gear 447. In this manner, a torque will be imparted to the differential carrier 436 to effect its rotation at the predetermined rapid traverse rate. A reversal in the direction of table travel at rapid traverse rate is electrically accomplished by reversing the direction of rotation of the rapid traverse motor 455.

Control of the three motors 412, 418 and 455 is effected electrically to produce a desired operating cycle. Either a continuous or intermittent operating cycle may be adapted by positioning a plurality of trip dogs on the front of the table 406, or a manual control of the motor operation is possible through the manipulation of a control mechanism to be hereinafter more fully described. By setting up an automatic operating cycle, it is possible to effect movement of the table 406 for precise predetermined distances at either feed or rapid traverse rates, or any combinations thereof, and to effect reversal in the direction of movement at any preselected limits of travel.

The spindle drive motor 412, the feed motor 418, and the rapid traverse motor 455 are each energized from supply lines 460, 461 and 462, with the current to the lines controlled through a master switch 463. Upon the closure of master switch 463, current is made available to each of the solenoid actuated motor starting switches. Thus, in the case of the spindle motor 412, the current will flow into a spindle motor switch 464. When this switch is closed, the current will flow through the switch contacts to lines 465, 466 and 467 connecting with the spindle motor. The closure of the master switch 463 will likewise permit a current flow to a pair of rapid traverse motor switches 468 and 469. These switches are electrically controlled so that only one or the other can be closed at a particular instant to energize the rapid traverse motor 455 for operation in a desired direction of rotation. When the rapid traverse motor switch 468 is closed, a circuit is completed from the supply lines 460, 461 and 462 through the switch to lines 470, 471 and 472 connecting with the rapid traverse motor 455 and effect its operation in one direction. Whereas, a closure of the rapid traverse motor switch 469 will complete a circuit from the supply lines 460, 461 and 462 through the switch and lines 473, 474 and 475 connecting with the motor 455, and energize it for operation in the opposite direction. The closure of the master switch 463 also makes the current available to the feed motor starting switches 481 and 482. A closure of the switch 482 permits a current flow from the supply lines 460, 461 and 462 through the closed switch and lines 497, 476 and 477 to the feed motor 418. When the feed motor switch 481 is closed, the current will flow from the supply lines through the switch and the conductors 478, 479 and 480 to the feed motor. The hook-up is such that the closure of the switch 481 will effect motor rotation in one direction while the closure of the switch 482 will effect motor rotation in the opposite direction. The electric control of the feed motor switches 481 and 482 is such that while both switches may be opened at a particular instant, only one of the two switches can be closed at a given instant.

An electric control system is provided to afford complete operating control of the three motors 412, 418 and 455. Power for driving the table 406 is provided by energizing either the feed rate motor 418 or the rapid traverse motor 455, whereas the direction of table travel is controlled by electrically reversing the said drive motors. The spindle motor 412 is connected into the control system in a manner to have the cutter 408 rotating whenever the work retaining table is being drive at feed rate through energization of the feed motor 418.

Electric control of the motors is provided through the manual or automatic operation of a drum switch mechanism or control unit 483 mounted on the front of the saddle 407. This switch mechanism is similar in structure to the control unit 316 previously described in connection with the first modified version of the invention, and includes a drum 484 rotatably mounted on a shaft 485 journalled in the saddle 407. Manual rotation of the drum is effected through the manipulation of a control handle 486 mounted on the front of the machine, as shown in Fig. 23. The handle is fixedly attached to the outer end of the shaft, while a gear 487 is keyed to the other end of the shaft. Automatic operation of the drum switch 483 is effected by the operation of this gear, as will be hereinafter more fully described. As shown in Fig. 24, the drum 484 is made up of a nonconductive material having a plurality of conductor segments molded therein and presenting a plurality of contact surface on the peripheral face of the drum. These contact surfaces are predeterminately spaced to act as electric conductors when the drum is selectively rotated to certain of the five positions. The contact surfaces are arranged in seven circumferential paths, as diagrammatically indicated in Fig. 24.

The low voltage control circuits, as set up by the operation of the drum switch 483, are energized from the supply lines 461 and 462 connected with a transformer 488 by means of conductors 489 and 490. The secondary winding of the transformer 488 is connected to conductors 491 and 492. The conductor 491 is disposed to supply current to a pair of brush terminals 493 and 494, while the conductor 492 is disposed to supply current to another pair of brush terminals 495 and 496. The drum 484 may be positioned so that none of the control circuits are energized since none of the brush terminals engage the contact surfaces on the face of the drum. When the switch is shifted to a second position, the current from the line 491 passes through the terminal 493 and the engaged drum contact segments to a line 498 connecting with a solenoid 499 operatively disposed to actuate the feed motor switch 481. The solenoid 499 is also connected to a line 501 which connects with a feed motor overload device 502, and which, in turn, is connected to a line 503. The line 503 connects with the drum switch 483, which is positioned to permit a current passage to the brush terminal 495 connecting with the transformer line 492 to complete the circuit. When the solenoid 499 is thus energized, the feed motor switch 481 is actuated to a closed position to energize feed motor 418 for rotation in a given direction. When thus energized, the feed motor will operate to drive the table 406 leftwardly at feed rate.

When the table 406 is to be driven rightwardly at feed rate, the drum switch mechanism 483 must be rotated to a third position. With the drum 484 in this position, the low voltage control current will flow from the line 491 through the switch to a line 506 which connects with one terminal of an actuating solenoid 507 operatively disposed to shift the feed motor starting switch 482 from an open to a closed position. The solenoid is serially connected with an overload device 508, which, in turn, is connected to a line 509 joining with the return line 503. Thus, the control current from the solenoid 507 will flow through the overload device 508, the line 509, the line 503 through the drum switch 483 to the control circuit line 492. When the solenoid 507 is thus energized, the armature therein will operate to close the feed motor switch 482 and permit current to flow from the supply lines 460, 461 and 462, to the feed motor 418. The feed motor will then rotate to cause the table 406 to move rightwardly at feed rate. The arrangement of the contact segments on the peripheral surface of the drum 484 is such that only one of the two feed motor switches 481 and 482 can be closed at a given time. Each of the switches is provided with resilient means to retain the switch in a normally opened position so that the switch will open to disconnect the motor 418 from the supply line upon any movement of the drum 484 in the drum switch mechanism 483 which will cause the switch actuating solenoids 499 and 507, respectively, to be deenergized.

Whenever the feed motor 418 is energized through the closure of either of the motor starting switches 481 and 482, the spindle motor 412 will also be energized. Consequently, the cutter 408 will be rotating whenever the table 406 is being driven at feed rate. Supply line current flowing through the feed motor line 476 to the feed motor 418 is partially diverted through a line 512 connecting with an overload device 513 associated with the spindle motor 412. A conductor 514 connects the overload device with an actuating solenoid 515 operatively connected to the spindle motor starting switch 464. The solenoid is connected by line 516 with a spindle motor supply line joining with the supply line 460. Thus, whenever the feed motor 418 is energized, the spindle motor starting switch 464 will be actuated to a closed position wherein the supply line current will energize the spindle motor 412. A manually operated reversing switch 517, connected into the spindle feed lines 466 and 467, permits the operator to reverse the direction of rotation of the spindle motor 412 and, consequently, to reverse the direction of rotation of the cutter 408 and spindle 410. With this arrangement, the operator may selectively position the reversing switch 517 for a particular cutter and the cutter will be driven in the selected direction regardless of the direction of rotation of the feed motor 418.

The table 406 may also be driven at rapid traverse rate in either direction. The drum switch mechanism 483 may be manipulated to cause the control current to flow through the contact segments on the drum 484 via the brush terminals 494 and 496 to actuate the rapid traverse motor starting switch 468. Thus, the control current from the line 491 will flow through the drum switch and a line 519 to an actuating solenoid 520 operative on the starting switch 468. Thereafter, the current will flow through line 521, a line 523 and the drum contact segment joining with the brush terminal 496 to the control circuit line 492. When the circuit is completed, the solenoid 520 will operate to close the switch 468 and permit the supply line current to energize the rapid traverse motor 455 and cause the table 406 to be driven rightwardly at rapid traverse rate.

If the table is to be driven leftwardly at rapid traverse rate, the drum switch mechanism 483 must be manually or automatically actuated to rotate the drum 484 to another position. At this time, the control current from the line 491 will flow through the brush terminal 494 and the contact segment in the drum to a line 525 joining with an overload device 526. This device, in turn, is connected to an actuating solenoid 527. Thereafter, the current will flow through a line 528 joining with the return line 523 and then through the drum switch to the control line 492. The energization of the coil in the solenoid 527 serves to actuate the armature therein and to operate the rapid traverse motor starting switch 469. The closure of this switch serves to energize the rapid traverse motor 455 and to provide power for driving the table 406 in a leftwardly direction. The drum control arrangement is such that only one of the rapid traverse motor starting switches 468 and 469 may be energized at a given instance. Each of the switches is resiliently retained in a normally opened position and may be actuated to a closed position only upon the energization of its associated solenoid.

Automatic operation of the drum switch mechanism 483 is made possible by means of an automatic actuating mechanism 530, as shown in Figs. 22 and 23. This mechanism is disposed on the front of the machine and is operably mounted in the saddle 407. An actuating post 531 is slidably mounted for axial movement in the saddle. The upper end of the post extends above the saddle and has formed thereon a diamond shaped lug 532. The lug extends rearwardly from the back side of the post 531 and is disposed to be engaged by any one of a plurality of trip dogs mounted in a well known manner on the front face of the machine tool table 406. The tripping post 531 may be actuated to one of five positions depending upon the setting of the trip dogs. A gear rack 533 machined on the lower end of the post 531 is disposed to engage the teeth of the gear 487 keyed for unitary operation with the drum switch shaft 485. When the drum 484 is rotated to either position for effecting leftward movement of the table at a rapid traverse or feed rate, the trip post 531 is raised upwardly to one of two positions. When the drum is rotated to either position for effecting rightward movement of the table at a rapid traverse or feed rate, the tripping post 531 is lowered to one of two positions. If the table operating cycle is initially instituted by manually shifting the control lever 486 to one of the four power drive positions, an intermittent or continuous operating cycle may be instituted by mechanically shifting the position of the tripping post 531. This is accomplished through the engagement of the diamond-shaped lug 532 with certain trip dogs 535, 536, 537 and 538 predeterminately positioned and locked in T-slots on the front face of the table 406, as shown in Figs. 22, 23 and 24.

For example, if the table is moving rightwardly at feed rate, the trip dog 535 may be predeterminately positioned to engage the lug 532 on the tripping post and force it downwardly to the rapid traverse position. When this occurs, the tripping post is forced downwardly and the position of the drum switch mechanism will be changed so that the feed motor 418 will be deenergized and the rapid traverse motor 455 will be energized to effect rightwardly movement of the table at rapid traverse rate.

Later on in the operating cycle, the lug on the tripping post 531 may again be engaged by the trip dog 536. This dog is provided with a contact surface which is designed to engage the lug 532 while it is in the lowermost position and to force it upwardly. Thus, the engagement will effectively raise the tripping post 531 from the rapid traverse position to the feed rate position and cause the drum 484 and drum switch 483 to be rotated accordingly. Such rotation of the drum switch will serve to interrupt the electric control circuit momentarily to effectively disconnect the rapid traverse motor 455 and connect the feed motor 418 whereby the rapid traverse movement of the table 406 to the right will be stopped and feed rate movement of the table to the right will be instituted.

On the other hand, if the table is moving leftwardly at feed rate, the operating cycle may be predeterminately selected to bring the trip dog 537 into engagement with the lug 532 on the trip post at some point of table travel. When this occurs, the trip post 531 will be raised from the feed rate position, to the uppermost rapid traverse position. As viewed in Fig. 22, the drum switch 483 will be rotated counter-clockwise to instantly interrupt the control circuit energizing the actuating solenoid 499 for the feed motor starting switch 473 and, consequently, stop leftwardly movement of the table at feed rate. Thereafter, the control circuit actuating the rapid traverse motor starting switch 469 will be completed and the rapid traverse motor 455 will be energized to effect leftwardly movement of the table 406 at rapid traverse rate.

Continued leftwardly movement of the table at rapid traverse rate may thereafter be halted and again changed to feed rate by predeterminately positioning the trip dog 538. In this case, the trip dog 538 serves to force the tripping post 531 downwardly from the uppermost rapid traverse position to the feed position, wherein the drum 484 in the drum switch 483 is rotated clockwise. Such rotation will serve to disconnect the rapid traverse motor 455 from the supply lines and thus stop leftwardly movement at rapid traverse rate. Simultaneously, the control circuit to effect energization of the feed motor 418 will be completed and leftwardly movement of the table will again proceed at feed rate.

Automatic reversal in the direction of table travel may be effected by means of the automatic actuating mechanism 539. Reversal during rightwardly movement of the table at either feed or rapid traverse rates is effected through the engagement of a reversing dog 540 with a horizontally disposed trip rod 541 centrally disposed on the saddle 407, as shown in Fig. 22, while reversal during leftwardly movement of the table is controlled through the engagement of a reversing dog 542 with the trip rod 541. Each of the reversing dogs 540 and 542 are selectively positioned in the lower T-slot on the front face of the table and, as shown in Fig. 23, are disposed to operate in a vertical plane different from that of the tripping post 531, in order to avoid any possible mistake in the operation of the various trip dogs. As shown in Figs. 22 and 24, the trip rod 541 is disposed for horizontal axial movement and is attached to a rack member 543. The rack member meshes with a gear segment 544 formed on the end of a switch contact arm 545 appropriately journalled on the saddle 407. A detent mechanism 546 is operatively disposed to retain the arm 545 and the trip rod 541 in a normal central position. However, if the trip rod 541 is engaged by either of the reversing trip dogs 540 and 542, the arm 545 will be shifted to one of two contact closing positions.

Thus, for example, if it is necessary to effect a reversal in the direction of table travel while the table 406 is moving rightwardly, the reversing dog 540 will be positioned to engage the trip rod 541 at a selected point of table travel. Such engagement will cause the rod 541 and the rack 543 associated therewith to move rightwardly and force the contact arm into engagement with a contact terminal 547. Since the contact arm includes an electric contact connected to control circuit supply line 548 which is also connected to the control circuit line 492, the low voltage current will flow through the arm and the contact terminal 547 to a line 549 joining with an actuating solenoid 550. The solenoid is connected to a return line 551 which joins with the other control-circuit conductor 491 to complete the circuit. The energization of the solenoid 550 serves to shift a horizontally disposed rack member 552 rightwardly. The teeth on the rack 552 mesh with teeth on an elongated gear 553 appropriately journalled, and effect its counter-clockwise rotation. The teeth of the gear 553 also mesh with a vertically disposed rack member 554 and, in the particular instance, will cause it to move downwardly. Teeth on the lower end of rack member 554 mesh with a gear segment 555. The gear segment is rotatably mounted on a shaft 556 and is retained in position by means of a resiliently operative detent mechanism 557 which engages a five-notch detent cam surface 558 thereon. As shown in Fig. 24, the detent plunger is disposed in the center notch wherein the tripping post 531 is retained in a neutral position through the engagement of a second gear segment 559 with a gear rack 560 machined on the lower end of the tripping post. However, when the solenoid 550 is energized, the rack members 552 and 554 operate to rotate the multiple gear segments 555 and 559 clockwise to raise the tripping post 531 to a position calling for leftwardly movement of the table at feed rate. Since the other rack teeth 533 on the tripping post are in engagement with the gear teeth 487, the drum switch mechanism 483 will be correspondingly operated to complete the necessary control circuits, whereby the feed motor 418 will be energized for effecting leftwardly movement of the table 406.

Reversal of table movement may be effected while the table is moving leftwardly at either feed or rapid traverse rates through the engagement of the reversing dog 542 with the trip rod 541. When this occurs, the rod and its associated rack member 543 will be displaced leftwardly to rotate the gear segment 544 and contact arm 545 counter-clockwise from the neutral position shown in Fig. 24. The insulated contact member on the end of the arm 545 will be moved into engagement with a contact terminal 563 which connects with a conductor 564. The conductor connects with a solenoid 565, which has an armature attached to the rack member 552. The solenoid is also connected to the return line 551 via a conductor 566. Consequently, the movement of the contact arm 545 will permit control current to flow from the conductor 492 and conductor 548 through the insulated contact arm and the terminal 563 to the solenoid 565 by the conductor 564. Thus, the solenoid will be energized to actuate the rack members 552 and 554 and cause the multiple gear segments 555 and 559 to rotate in a counter-clockwise direction. This rotation will lower the tripping post 531 from its previous position to a position calling for feed rate movement of the table to the right. Such axial movement of the post will effectively reposition the drum 484 in the drum control switch 483 to complete the necessary control circuits and to actuate the feed motor starting switch 482 and, consequently, effect the energization of the feed motor 418 wherein the table will be driven rightwardly at feed rate. Intermediately after the rightwardly movement of the table has begun, the reversing dog 542 will move out of engagement with the trip rod 541 and the detent mechanism 546 will operate on the gear segment member 544 and rack 543 to return the tripping rod 541 to the central or neutral position shown in Figs. 22 and 24. However, the detent mechanism 557 operative on the multiple gear segments 555 and 559 will serve to retain the tripping post 531 in the position to which it was shifted to effect the rightwardly movement of the table at feed rate. The tripping post 531 will remain in this position until it is again engaged by one of the trip dogs or operated upon by the automatic actuating mechanism 530, as previously described.

A continuous operating cycle may be set up by using both of the reversing dogs 540 and 542 to effect reversal at the prescribed limits of rightwardly and leftwardly movement of the table. Or, an intermittent operating cycle may be set up by using just one of the reversing dogs and by using a stop dog 568 to automatically stop the cycle at a prescribed limit of travel. In either case, the operating cycle is initially started through the manual manipulation of the control lever 486 to one of the four positions calling for power movement of the table. Thereafter, the various trip dogs will take over the control of the operating cycle and will cause it to continue until such a time that the operator sees fit to stop the cycle by moving the control lever 486 to the neutral position, or when a stop dog 568 is positioned to engage the lug 532 on the tripping post 531 and move it to the neutral position. In either case, the drum control switch 483 will be rotated to the neutral or center position in which all of the brush terminals are out of contact with the contact segments on the face of the drum 484 and, consequently, none of the control circuits are completed. It will be apparent from this explanation that any number of combinations of operating cycles may be set up by selectively positioning various trip dogs to produce any cycle of table performance which may be necessary for a high speed production milling operation. After the trip dogs have been selectively positioned for a particular operating cycle, the exposed portion of the tripping post 531 and the trip rod 541 together with all of the trip dogs, are enclosed by means of a cover 569, shown in Fig. 23, attached to the table. A cover 570 removably secured to the front face of the bed 401 provides access to the drum switch mechanism 483 and the automatic actuating mechanism 530.

With any of the various versions of the invention aforedescribed, a movable member or members of a machine tool can be power driven according to the dictates of any preselected operating cycle required for a particular cutting operation. The movable member controlled in this manner may be either of the work retaining type or the cutter retaining type. Each of the versions aforedescribed, may be subject to several modifications including the incorporation of mechanical and hydraulic controls.

Although the apparatus shown in the drawings has been described in considerable detail for the purpose of fully setting forth a machine tool embodying the invention, it is to be understood that the structure herein described is intended to be illustrative only and that the various novel features of the invention may be incorporated in other structural forms without departing from the spirit and scope of the invention, as defined in the subjoined claims.

The principles of the invention having now been fully explained in connection with the foregoing description of an illustrative preferred embodying structure, we hereby claim as our invention or discovery:

1. An electric switch control element for a machine tool having a movable member comprising a frame, a plurality of switches mounted in said frame, a manually manipulable control handle mechanism mounted in said frame for swivelable and axial movement, linkage mechanism connecting said handle mechanism with said switches, a plurality of actuating arms extending from said frame and connected with said linkage mechanism, and a plurality of trip dogs carried on the movable member of the machine tool for selective positioning thereon and disposed to engage said actuating arms in a predetermined sequence during movement of the tool member, whereby said switches may be automatically actuated in a predetermined sequence by said trip dogs or selectively actuated by the manual manipulation of said control handle.

2. In a transmission for connecting a source of power to drive a movable element of a machine, a shaft journalled in the machine and connected to be driven by said source of power, a worm resiliently mounted on said shaft to rotate with it and movable axially against its resilient mounting when subjected to a predetermined excessive load, a pair of switches connected to control said source of power, a rod slidably mounted in the machine, a cam shoe fixedly mounted on said rod in position to engage both of said switches when the rod is in its normal position but permitting one or the other of said switches to open when the rod is moved axially from its normal position in either direction, and a pair of feeler forks fixedly mounted on said rod in position to be engaged individually by said worm when it is moved axially from its normal position, whereby said worm will engage one or the other of said feeler forks, depending upon its direction of movement when moved axially by a predetermined excessive load, and effect movement of said rod and said cam shoe to permit one of said switches to open and interrupt the flow of power from said source to stop said movable element.

3. In an electrical control system for controlling the operation of a movable element of a machine tool, a source of power, a reversible rapid traverse motor connected to receive power from said source and to drive said movable element at a rapid rate, a reversible feed motor connected to receive power from said source and to drive said movable element at a plurality of feed rates selectively, a direction switch connected to selectively control the direction of rotation of either motor, a first normally closed limit switch connected to control either of said motors to interrupt rotation in a clockwise direction when energized and to simultaneously control said motors to permit re-energization for driving in a counterclockwise direction, and a second normally closed limit switch connected to control either of said motors to interrupt rotation in a counterclockwise direction when energized and to simultaneously control said motors to permit re-energization for driving in a clockwise direction.

4. In an electrical control system for controlling the operation of a movable element of a machine tool, a source of power, a motor connected to receive power from said source and to drive said movable element in its path of movement, a direction switch connected to selectively direct the flow of power to said motor to control its direction of rotation, a first normally closed limit switch connected to control said motor to interrupt rotation in a clockwise direction when actuated and to simultaneously control said motor to permit re-energization for driving in a counterclockwise direction, and a second normally closed limit switch connected to control said motor to interrupt rotation in a counterclockwise direction when actuated and to simultaneously control said motor to permit re-energization for driving in a clockwise direction.

5. An electric control system for a machine tool having a movable machine element power driven selectively by a feed motor or a rapid traverse motor and comprising a power source, a control unit mounted on the machine tool and electrically connected to said power source and said motors, a plurality of switches disposed in said control unit for actuation by limit defining trip dogs on said movable element, a switch in said control unit electrically connected when actuated to effect reversal of either of said motors, a switch disposed in said control unit to disconnect said feed motor when actuated, a switch in said control unit electrically connected to energize said rapid traverse motor when actuated, and a control lever swivelably and axially movable on said control unit in a manner to selectively actuate said last three mentioned switches selectively, whereby said motors may be selectively controlled automatically by the operation of said trip dogs or manually by the manipulation of said control handle.

6. An electric switch control mechanism for a machine tool having a movable member selectively power driven in either direction by one of two motors and comprising a frame, a plurality of switches mounted in said frame, a manually manipulatable control handle mounted in said frame and operably disposed for swivelable and axial movement, a linkage mechanism operatively connected to said handle to selectively actuate one of said switches, a pair of actuating arms rotatably and axially disposed upon engagement with trip dogs on the movable machine tool element to operate said linkage mechanism, a detent mechanism disposed to engage said linkage mechanism and retain the same in either of two positions, a plunger operatively disposed to actuate another of said switches upon axial movement of said control handle, a piston member connectibly operative upon vertical swivelable movement of said control handle to selectively energize still another of said switches, a detent mechanism operatively disposed in said control unit to retain said piston member in either of two positions, a plurality of button actuators individually operative to actuate two of said switches and define the limits of travel of the movable element upon engagement with trip dogs selectively positioned thereon, whereby control of directional movement and limits of movement is readily provided for the movable machine tool element through a single control unit.

7. An electric switch control element for a machine tool having a movable member selectively power driven by either of two electric motors and comprising a frame, a plurality of switches mounted in said frame, a manually manipulatable control handle mechanism mounted in said frame for swivelable or axial movement, a linkage mechanism keyed to said control handle mechanism for coordinated movement therewith and disposed to actuate one of said switches, a plurality of actuating arms extending from said frame and connected with said linkage mechanism to effectively actuate said switch upon engagement with trip dogs carried on the movable member, a second linkage mechanism operatively disposed in said control unit for engagement with said control handle mechanism to effectively actuate another of said switches whenever said control handle is manipulated axially, and a third linkage mechanism disposed in said control unit for axial movement to engage another of said switches whenever said control handle is rotatably manipulated whereby complete electric control over a plurality of electric motors is afforded by the selective manipulation of a single control handle.

JOSEPH B. ARMITAGE.
THEODORE F. ESERKALN.

References Cited in the file of this patent
UNITED STATES PATENTS

| Number | Name | Date |
|---|---|---|
| 522,597 | Hutchinson | July 10, 1894 |
| 1,297,121 | Eaton | Mar. 11, 1919 |
| 1,397,731 | Goetz et al. | Nov. 22, 1921 |
| 1,621,368 | Hilliard | Mar. 15, 1927 |
| 1,717,326 | Shaw et al. | June 11, 1929 |
| 1,857,162 | Nenninger | May 10, 1932 |
| 1,987,450 | Sundstrand | Jan. 8, 1935 |
| 2,011,836 | Sundstrand | Aug. 20, 1935 |
| 2,030,007 | Kingsbury | Feb. 4, 1936 |
| 2,040,528 | Parsons | May 12, 1936 |
| 2,203,298 | Granberg | June 4, 1940 |
| 2,217,671 | Coffin et al. | Oct. 15, 1940 |
| 2,224,106 | Ridgway | Dec. 3, 1940 |
| 2,398,346 | Anderson | Apr. 16, 1946 |